United States Patent
Kang et al.

(10) Patent No.: US 9,973,824 B2
(45) Date of Patent: May 15, 2018

(54) ELECTRONIC DEVICE AND METHOD OF SCANNING CHANNELS IN ELECTRONIC DEVICE

(71) Applicant: SAMSUNG ELECTRONICS CO., LTD., Suwon-si (KR)

(72) Inventors: Hye-jin Kang, Seoul (KR); Su-gyeong Hyeon, Daegu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days. days.

(21) Appl. No.: 15/247,123

(22) Filed: Aug. 25, 2016

(65) Prior Publication Data
US 2017/0180813 A1    Jun. 22, 2017

(30) Foreign Application Priority Data
Dec. 22, 2015 (KR) ........................ 10-2015-0184071

(51) Int. Cl.
| | |
|---|---|
| *H04N 5/445* | (2011.01) |
| *G06F 3/00* | (2006.01) |
| *G06F 13/00* | (2006.01) |
| *H04N 21/482* | (2011.01) |
| *H04N 21/466* | (2011.01) |

(Continued)

(52) U.S. Cl.
CPC ..... *H04N 21/482* (2013.01); *H04N 21/41407* (2013.01); *H04N 21/4223* (2013.01); *H04N 21/44218* (2013.01); *H04N 21/44222* (2013.01); *H04N 21/4667* (2013.01); *H04N 21/84* (2013.01); *H04N 21/4826* (2013.01)

(58) Field of Classification Search
None
See application file for complete search history.

(56) References Cited

U.S. PATENT DOCUMENTS 6,721,953 B1 *  4/2004 Bates ................ H04N 5/44543
                                                  348/E5.102
8,589,977 B1 * 11/2013 Frusciano .......... H04N 5/44543
                                                  715/785

(Continued)

FOREIGN PATENT DOCUMENTS

| KR | 2002-0061126 A | 7/2002 |
|---|---|---|
| KR | 10-0358402 B1 | 11/2005 |

(Continued)

OTHER PUBLICATIONS

BNCPLAN, "Sky Life 3800 manual", http://www.bncplan.co.kr/index.php?document_srl=3526&mid=boa_04, Jan. 11, 2010, total 26 pages.

(Continued)

*Primary Examiner* — James R Marandi
(74) *Attorney, Agent, or Firm* — Sughrue Mion, PLLC

(57) ABSTRACT

An electronic device includes a detector configured to detect a user input and a controller configured to determine a favorite channel group according to a user's viewing history, scan channels in response to detecting an input of a control signal corresponding to a channel shift button for a predetermined time, and decrease a channel shift speed in a favorite channel group section corresponding to the determined favorite channel group and increase the channel shift speed in a section other than the favorite channel group section.

19 Claims, 18 Drawing Sheets

(51) Int. Cl.
     *H04N 21/84*     (2011.01)
     *H04N 21/414*    (2011.01)
     *H04N 21/4223*   (2011.01)
     *H04N 21/442*    (2011.01)

(56) References Cited

U.S. PATENT DOCUMENTS

| | | | |
|---|---|---|---|
| 2004/0268419 A1* | 12/2004 | Danker | H04N 7/173 725/136 |
| 2007/0234395 A1* | 10/2007 | Dureau | H04N 5/4401 725/135 |
| 2010/0118211 A1 | 5/2010 | Carlsgaard et al. | |
| 2011/0271302 A1 | 11/2011 | Carlsgaard et al. | |
| 2011/0283320 A1* | 11/2011 | Levin | H04N 21/466 725/40 |
| 2016/0316269 A1* | 10/2016 | Parker | H04N 21/4667 |

FOREIGN PATENT DOCUMENTS

| | | |
|---|---|---|
| KR | 10-2012-0069961 A | 6/2012 |
| WO | 2014/028072 A1 | 2/2014 |

OTHER PUBLICATIONS

International Search Report (PCT/ISA/210) & Written Opinion (PCT/ISA/237) dated Nov. 25, 2016 issued by the International Searching Authority in counterpart International Application No. PCT/KR2016/009372.

\* cited by examiner

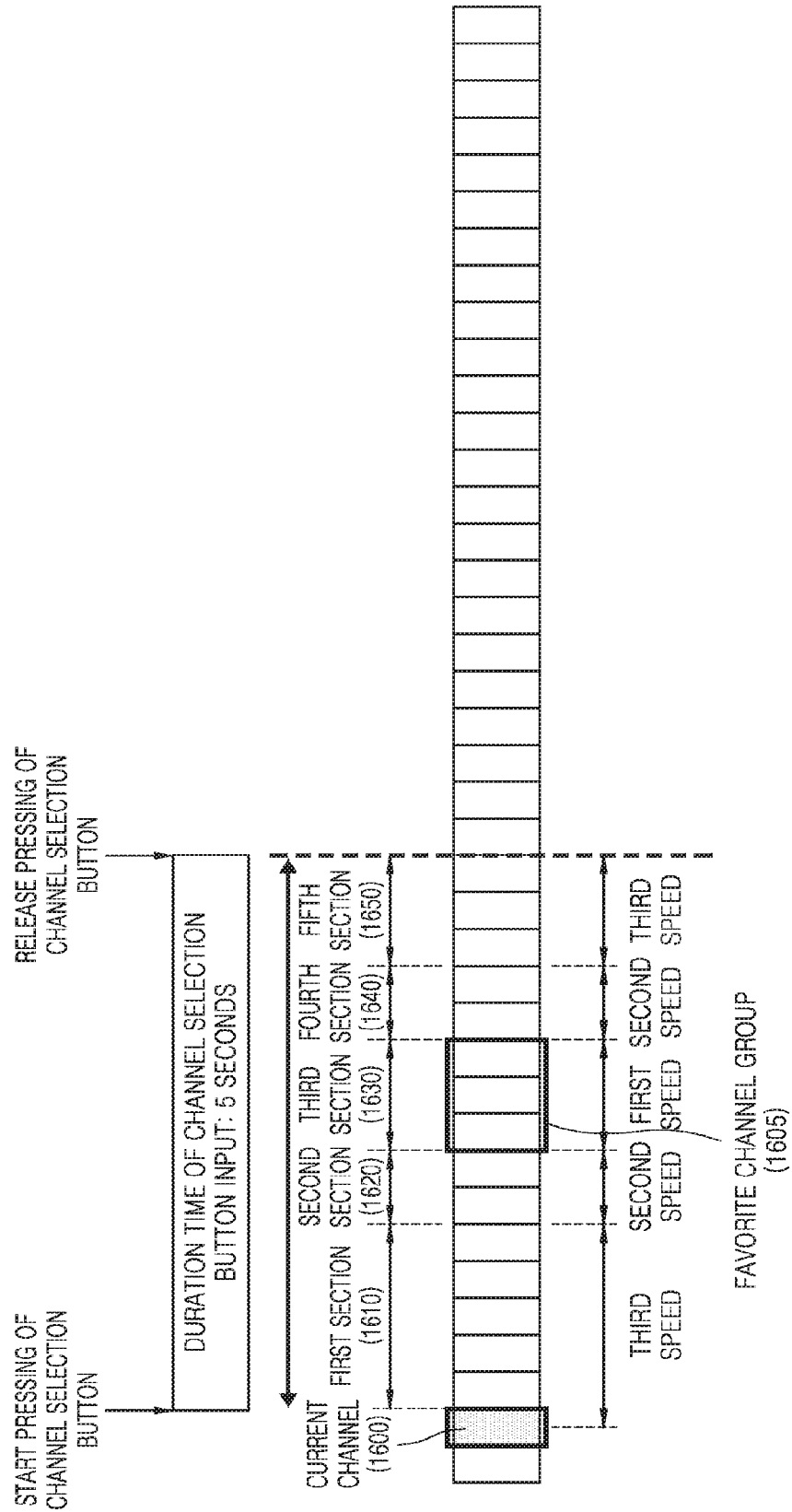

ELECTRONIC DEVICE AND METHOD OF SCANNING CHANNELS IN ELECTRONIC DEVICE

CROSS-REFERENCE TO RELATED APPLICATION

This application claims priority from Korean Patent Application No. 10-2015-0184071, filed on Dec. 22, 2015, in the Korean Intellectual Property Office, the disclosure of which is incorporated herein by reference in its entirety.

BACKGROUND

1. Field

Apparatuses and methods consistent with exemplary embodiments relate to an electronic device and a method of scanning channels in the electronic device, and more particularly, to favorite channel scanning.

2. Description of the Related Art

Display devices include a function of displaying images to users. Users may watch on a display a broadcast program selected by a user from among broadcast signals sent out from broadcasting stations. Throughout the world, broadcasting is being converted from analog broadcasting to digital broadcasting.

Digital broadcasting may refer to broadcasting digital images and sound signals. The digital broadcasting, compared to analog broadcasting, has less data loss due to its resistance to external noise, is advantageous for error correction, has a high resolution, and provides a definitive image. Also, digital broadcasting is capable of providing bi-directional services unlike analog broadcasting.

In current digital multichannel broadcasting, hundreds of channels are provided so that users perform numerous key inputs and operations to get program information and shift to a desired channel. For users to shift to a desired channel, there is a method of obtaining program information by pressing channel up/down keys from the first channel number to the last channel number and shifting channels, a method of directly inputting a channel number to shift to a desired channel based on program information that a user already knows, and a method of changing to a desired channel using an electronic program guide (EPG) that provides information about programs and channels hour by hour. However, these methods are inconvenient because users need to directly manipulate keys to shift to a desired channel. To address the above issues, a function of registering favorite channels favored by the user has been provided. However, the function is not that useful because it is inconvenient to set favorite channels in advance.

SUMMARY

One or more exemplary embodiments include an electronic device that may provide users with convenient and effective scanning of user's favorite channels, and a method of scanning channels in the electronic device.

Additional aspects will be set forth in part in the description which follows and, in part, will be apparent from the description, or may be learned by practice of the exemplary embodiments.

According to an aspect of an exemplary embodiment, there is provided an electronic device including a detector configured to detect a user input; and a controller configured to: determine a favorite channel group according to a user's viewing history; in response to detecting the user input of a control signal corresponding to a channel shift button for a predetermined time, scan channels at a channel shift speed; and decrease the channel shift speed in a favorite channel group section corresponding to the determined favorite channel group and increase the channel shift speed in a section other than the favorite channel group section.

The controller may be further configured to, during the determining of the favorite channel group: determine a favorite channel based on the user's viewing history; determine at least one other channel besides the determined favorite channel having properties related to the determined favorite channel by using metadata of the determined favorite channel; and determine the favorite channel group including the determined favorite channel and the at least one other channel.

The electronic device may further include a communicator configured to receive information about another user's viewing history from a server, wherein the controller may be further configured to determine the favorite channel group based on the information received about the other user's viewing history.

The controller may be configured to decrease the channel shift speed as a channel approaches the favorite channel group section and increase the channel shift speed as the channel moves away from the favorite channel group section.

The favorite channel group section may include the favorite channel group and at least one adjacent channel that is adjacent to the favorite channel group.

The controller may be configured to increase the channel shift speed as a continuous input time of the control signal according to the channel shift button increases.

The controller may be configured to select a favorite channel that is located nearest to the channel, in a scanning direction, when the input of the control signal according to the channel shift button ends.

The detector may be configured to receive, from a control device, a control signal corresponding to the channel shift button.

The detector may be configured to detect the control signal corresponding to the channel shift button on a touch sensitive screen.

The detector may be further configured to recognize a user and the controller may be configured to manage the favorite channel group for each user recognized by the detector.

According to an aspect of another exemplary embodiment, there is provided a method of scanning a channel in an electronic device, the method including: in response to detecting an input of a control signal corresponding to a channel shift button for a predetermined time, scanning channels at a channel shift speed, wherein the channel shift speed is decreased in a favorite channel group section corresponding to a favorite channel group determined based on a user's viewing history, and the channel shift speed is increased in a section other than the favorite channel group section.

The favorite channel group may be generated by determining a favorite channel based on the user's viewing history, determining at least one other channel besides the determined favorite channel having properties related to the determined favorite channel by using metadata of the determined favorite channel, and determining the favorite channel group including the determined favorite channel and the at least one other channel.

The method may further include receiving from a server information about another user's viewing history; and determining the favorite channel group based on the information received about the other user's viewing history.

The scanning of the channels may include: decreasing the channel shift speed as a channel approaches the favorite channel group section; and increasing the channel shift speed as the channel moves away from the favorite channel group section.

The favorite channel group section may include the favorite channel group and at least one adjacent channel that is adjacent to the favorite channel group.

The scanning of the channels may include increasing the channel shift speed as a continuous input time of the control signal according to the channel shift button increases.

The method may include selecting a favorite channel that is located nearest to the channel, in a scanning direction, when the input of the control signal according to the channel shift button ends.

According to an aspect of another exemplary embodiment, there is provided a non-transitory computer readable storage medium having stored thereon a program, which when executed by a computer, performs a method including: in response to detecting an input of a control signal corresponding to a channel shift button for a predetermined time, scanning channels at a channel shift speed, wherein the channel shift speed is decreased in a favorite channel group section corresponding to a favorite channel group determined based on a user's viewing history, and the channel shift speed is increased in a section other than the favorite channel group section.

According to an aspect of another exemplary embodiment, there is provided a method of scanning channels in a display device, the method including: determining a user's viewing history according to a viewing frequency of at least one channel; determining a favorite channel group according to the user's determined viewing history; in response to detecting an input of a channel shift button for a predetermined time, scanning channels at a channel shift speed; decreasing the channel shift speed in the favorite channel group and increasing the channel shift speed outside of the favorite channel group.

The channel shift speed may include a first speed, a second speed that is faster than the first speed, and a third speed that is faster than the second speed.

The method may include, during the scanning of the channels: in response to a current channel being in a first section that is a first distance from the favorite channel group, scanning the channels at the third speed; in response to a current channel being in a second section that is a second distance from the favorite channel group, scanning the channels at the second speed; and in response to a current channel being in a third section that is within the favorite channel group, scanning the channels at the first speed.

BRIEF DESCRIPTION OF THE DRAWINGS

These and/or other aspects will become apparent and more readily appreciated from the following description of exemplary embodiments, taken in conjunction with the accompanying drawings in which:

FIGS. 16A and 16B are reference views illustrating an example of further increasing a channel shift speed as a duration time of a channel shift button input increases.

DETAILED DESCRIPTION

Figure 1:
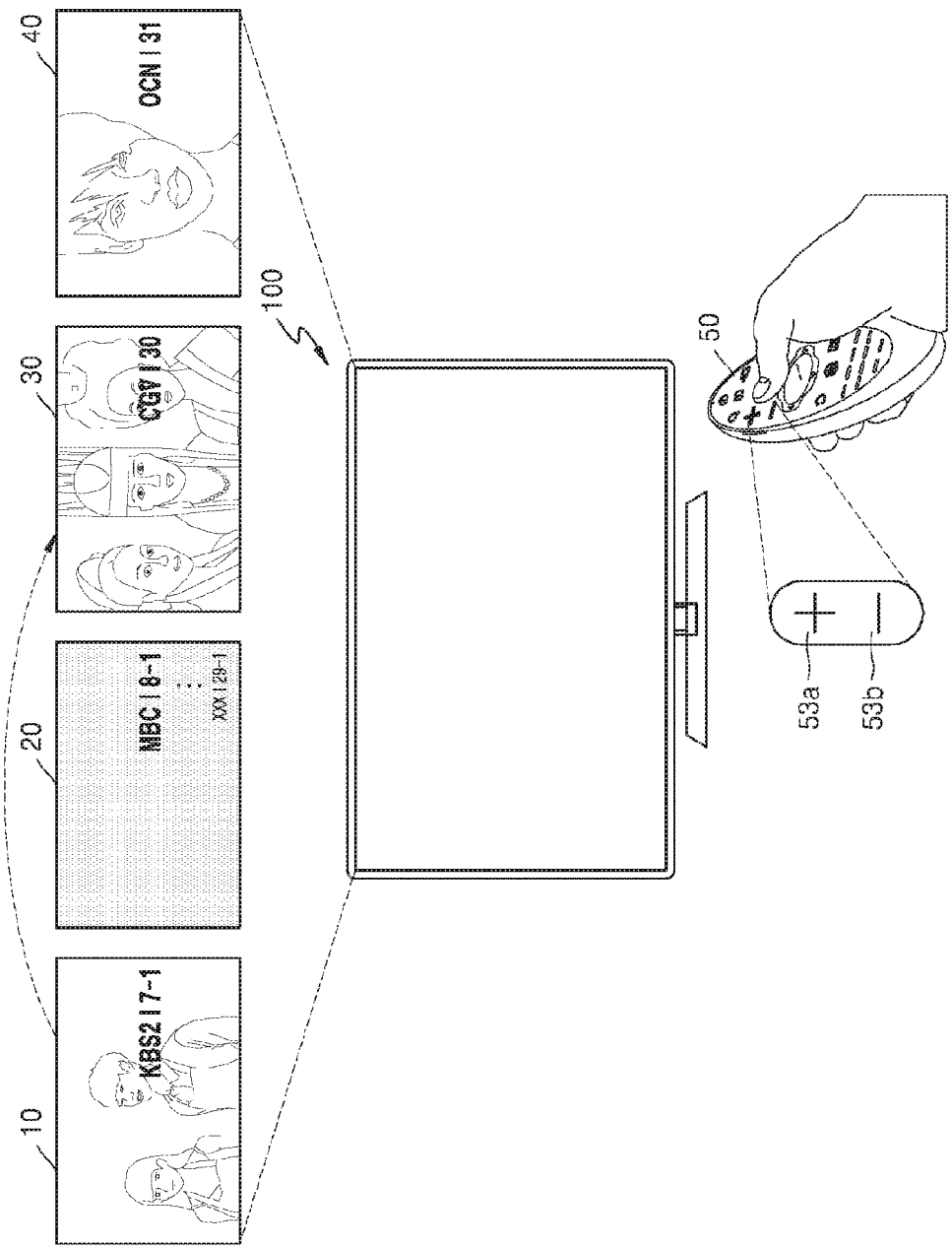
FIG. 1 is a reference view illustrating a concept of methods of scanning user's favorite channels according to one or more exemplary embodiments.

One or more exemplary embodiments will be illustrated in the drawings and described in detail in the written description. However, this is not intended to limit the inventive concept to particular modes of practice, and it is to be appreciated that any changes, equivalents, and substitutes that do not depart from the spirit and technical scope of the inventive concept are encompassed. Detailed explanations of the related art may be omitted if it is deemed that they may unnecessarily obscure the essence of the inventive concept.

The terms used in the present disclosure are used to describe exemplary embodiments, and are not intended to limit the inventive concept. An expression used in the singular encompasses the expression of the plural, unless it has a clearly different meaning in the context. It is to be understood that terms such as "including," "having," and "comprising" are intended to indicate the existence of the features, numbers, steps, actions, components, parts, or combinations thereof, and are not intended to preclude the possibility that one or more other features, numbers, steps, actions, components, parts, or combinations thereof may exist or may be added.

The term "and/or" includes any one of listed items and all of at least one combination of the items. For example, "A or B" may include A, B, or both of A and B.

Terms such as "first" and "second" are used herein to describe a variety of constituent elements, but the constituent elements are not limited by the terms. Such terms are used only for the purpose of distinguishing one constituent element from another constituent element. For example, a first constituent element may be referred to as a second constituent element, and vice versa.

When a constituent element, e.g., a first constituent element, is "(operatively or communicatively) coupled with/to" or is "connected to" another constituent element, e.g., a second constituent element, the constituent element contacts or is connected to the other constituent element directly or through at least one of other constituent elements, e.g., a third constituent element. Conversely, when a constituent element, e.g., a first constituent element, is described to "directly connect" or to be "directly connected" to another constituent element, e.g., a second constituent element, the constituent element may be construed to be directly connected to another constituent element without any other constituent element, e.g., a third constituent element, interposed therebetween. Other expressions, such as, "between" and "directly between", describing the relationship between the constituent elements, may be construed in the same manner.

Terms used herein are used for explaining one or more exemplary embodiments, not for limiting the inventive concept. Thus, an expression of singularity includes an expression of plurality unless clearly specified otherwise in context.

Unless defined otherwise, all terms used herein including technical or scientific terms have the same meanings as those generally understood by those of ordinary skill in the art. The terms as defined in generally used dictionaries are construed to have meanings matching that in the context of related technology and, unless clearly defined otherwise, are not construed to be ideally or excessively formal.

Reference will now be made in detail to an electronic device according to one or more exemplary embodiments, examples of which are illustrated in the accompanying drawings, wherein like reference numerals refer to like elements throughout. The term "user" may refer to a person who uses an electronic device or a device using an electronic device, e.g., an artificial intelligence electronic device.

FIG. 1 is a reference view illustrating the concept of methods of scanning user's favorite channels according to one or more exemplary embodiments.

Referring to FIG. 1, a display device 100 according to an exemplary embodiment receives and displays broadcast signals.

Referring to FIG. 1, the display device 100 is capable of communicating with a control device 50 in a wired or wireless manner.

The control device 50 may control the display device 100 by using short-range communication including infrared or Bluetooth. A user may operate the control device 50 to control functions of the display device 100 by using at least one input including buttons, a touchpad, a microphone receiving user's voice, and a sensor capable of recognizing a motion of the control device 50.

The control device 50 may include a power on/off button for turning the display device 100 on or off. The control device 50 may also set channel change, volume control, selection of terrestrial broadcasting/cable broadcasting/satellite broadcasting, or setting of environment of the display device 100, according to a user input.

According to an exemplary embodiment, the term "user" may refer to a person who controls functions or operations of the display device 100 by using the control device 50 and may include a viewer, a manager, or an installer.

The control device 50 is manipulated by the user to control the display device 100. The control device 50 may include channel shift buttons (e.g., channel change buttons) such as channel up/down buttons 53a and 53b to shift channels. The user may shift a channel in a direction in which a channel number increases, by pressing a channel up button 53a, and in a direction in which a channel number decreases, by pressing a channel down button 53b. The display device 100 may detect a signal received from the control device 50 according to the operation of pressing the channel up button 53a or the channel down button 53b of the control device 50 and then selecting a broadcast signal by changing channels. As such, the broadcast signal selected by the channel change may include a terrestrial signal, a cable signal, and/or a satellite signal, and also services provided by mapping contents provided by content providers on channels.

The display device 100 according to an exemplary embodiment may collect a user's viewing history and determine user favorite channels according to a collected user's viewing history. Also, the display device 100 may determine at least one of other channels having properties corresponding to the determined user's favorite channels and determine the favorite channel group including the determined user's favorite channels and the at least one of other channels, by using metadata of the determined user's favorite channels.

When a control signal corresponding to the channel shift button of the control device 50 is detected, the display device 100 changes a current channel to a next adjacent channel.

When a duration time of a control signal corresponding to the channel shift button of the control device 50 is detected to be over a certain time, the display device 100 according to an exemplary embodiment may scan channels to search for the favorite channel group. Channel scanning denotes scanning all channels in order and setting channels having incoming signals during scanning of channels to be received. For example, when an input duration time of a control signal corresponding to the channel shift button of the control device 50 exceeds a preset threshold value, the display device 100 may recognize the input to be a long press of the channel shift button. Also, when the input duration time is equal to or less than a preset value, the display device 100 may recognize the input to be a normal channel shift button input.

While scanning channels to search for the favorite channel group, the display device 100 according to an exemplary embodiment may decrease a channel shift speed in a section corresponding to the favorite channel group and increase the channel shift speed in a general channel section, i.e., not the favorite channel group section.

Referring to FIG. 1, a broadcast signal 10 of Channel "7" is currently output through the display device 100. In this state, when a user's long press of the channel up button 53a of the control device 50 is detected, the display device 100 scans a favorite channel group beginning with Channel "30". In doing so, the display device 100 may output a black screen 20 on which channel numbers only are sequentially and quickly displayed, without outputting images of broadcast signals, by increasing the channel shift speed from Channel "8" to Channel "29" before a favorite channel group section begins. Upon reaching the favorite channel group, the display device 100 may decrease the channel shift speed to allow the user to select a desired channel in a channel section corresponding to the favorite channel group.

Referring to FIG. 1, the display device 100 may output a broadcast signal 30 from a channel corresponding to Channel "30" from which channels corresponding to the favorite channel group begin. The display device 100 may select a favorite channel that is the most adjacent (e.g., closest channel) to a current channel when it is detected that the control signal according to the operation of pressing long the channel up button 53a of the control device 50 is no longer received, that is, a release of the long press. When there is no favorite channel that is most adjacent to the current channel, the display device 100 may select a general channel that is the most adjacent to the current channel. Accordingly, the user may select a desired favorite channel from the favorite channel group by releasing the long press of the channel up button 53a while the display device 100 outputs broadcast signals of channels corresponding to the favorite channel group. For example, in FIG. 1, when the display device 100 detects a release of the long press of the channel up button 53a while a broadcast signal of Channel "30" that is a part of the favorite channel group is output, the display device 100 may select Channel "31" that is the next favorite channel and output a broadcast signal 40 from Channel "31".

Figure 2:
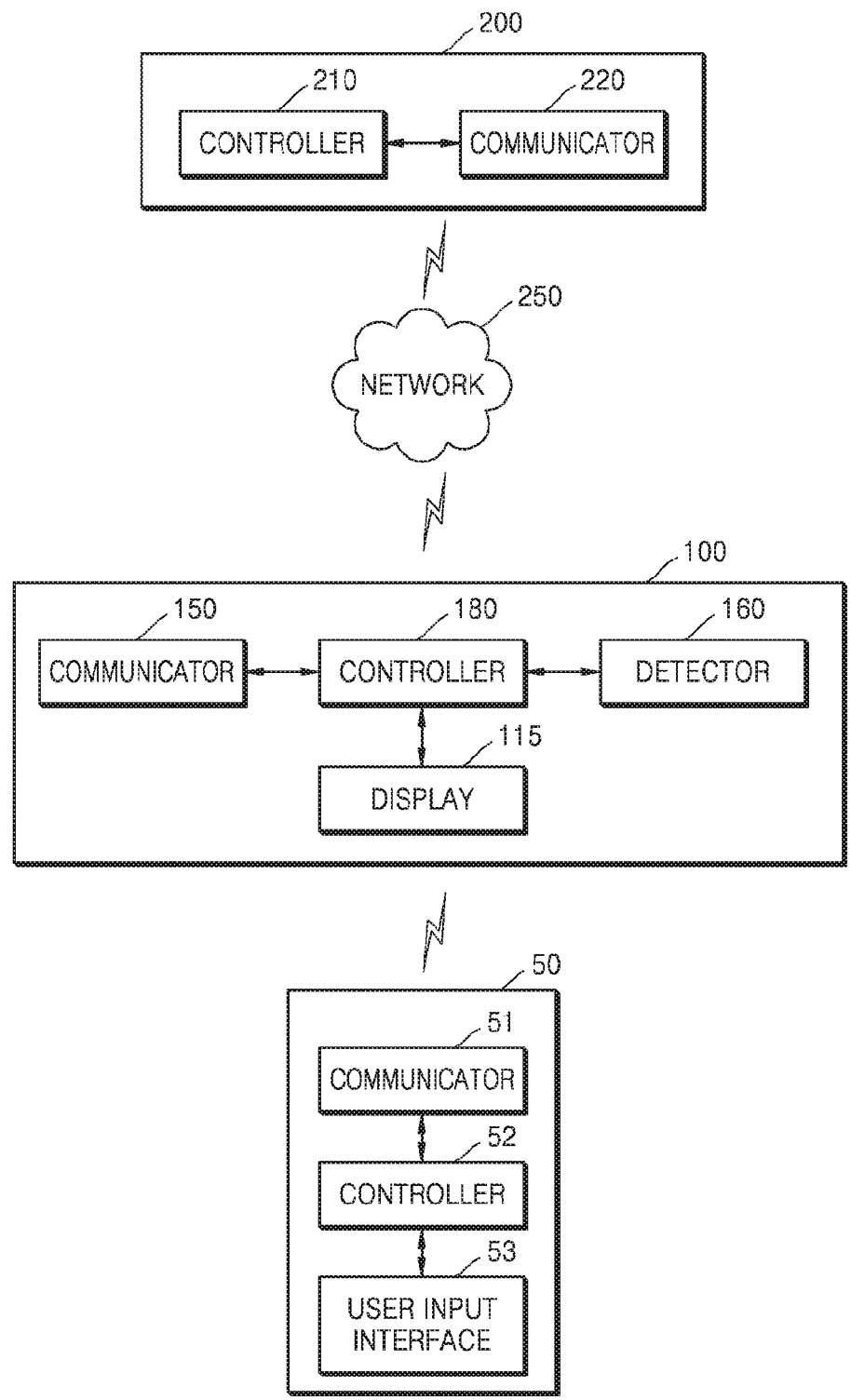
FIG. 2 is a block diagram of user's favorite channel scanning systems according to one or more exemplary embodiments.

FIG. 2 illustrates a user's favorite channel scanning system according to one or more exemplary embodiments.

Referring to FIG. 2, the user's favorite channel scanning system may include the display device 100 and a server 200, which may be communicated with each other via a network 250, and the control device 50 that controls the display device 100.

The display device 100 may include a controller 180, a communicator 150, a detector 160, and a display 115.

The communicator 150 enables receiving a broadcast signal from the outside or communicating with the server 200.

The detector 160 detects a user input signal and transfers a detected user input signal to the controller 180. The detector 160 may detect a user input from the control device 50, a user input through a camera, a user input through a microphone, or a user input through a touch sensor.

The controller 180 includes the detector 160 and the communicator 150 and controls overall elements of the display device 100. The controller 180 may include random access memory (RAM) that stores a signal or data input from outside the display device 100 or is used as a storage area corresponding to various jobs performed in the display device 100, read only memory (ROM) that stores a control program for controlling peripheral devices, and a processor. The processor may be embodied by a system-on-chip (SoC) incorporating a core and a graphics processing unit (GPU). Also, the processor may include a plurality of processors.

According to an exemplary embodiment, the controller 180 may determine a favorite channel group based on a user's viewing history, scan the favorite channel group in response to a long press input of the channel shift button, decrease a channel shift speed in a favorite channel group section corresponding to the determined favorite channel group during scanning of the favorite channel group, and increase the channel shift speed in a section other than the favorite channel group section.

According to an exemplary embodiment, during the determination of the favorite channel group, the controller 180 may determine a favorite channel based on the user's viewing history favorite channel, determine at least one of other channels having properties related to the determined favorite channel by using metadata of the determined favorite channel, and determine the favorite channel group including the determined favorite channel and the at least one of other channels.

According to an exemplary embodiment, the controller 180 may determine a favorite channel group based on information about other user's viewing history received from an external server.

According to an exemplary embodiment, the controller 180 may determine a favorite channel group based on a user selection. The controller 180 may generate a favorite channel group by receiving a user input for assigning one or more channel to be included in the favorite channel group.

According to an exemplary embodiment, during scanning of the favorite channel group, the controller 180 may decrease the channel shift speed as the channel approaches the favorite channel group section and increase the channel shift speed as the channel is farther from the favorite channel group section.

According to an exemplary embodiment, the controller 180 may increase the channel shift speed as a duration time of the long press input of the channel shift button extends.

According to an exemplary embodiment, the controller 180 may select a favorite channel located nearest in a scanning direction when the long press input of the channel shift button of the control device 50 ends.

According to an exemplary embodiment, the controller 180 may determine a favorite channel group based on the user's viewing history, scans input of the channel shift button of the control device 50, shift to a channel adjacent to the current channel when the duration time of the channel shift button input is less than a predetermined value, and scan the favorite channel group when the duration time of the channel shift button input is greater than the predetermined value.

The functions performed by the display device 100, that is, collecting a user's viewing history, determining a user's favorite channel based on a collected user's viewing history, and determining a favorite channel group based on the determined user's favorite channel may be performed not only by the display device 100, but also by a set-top box or IP set-top box connected to the server 200 or the display device 100.

The network 250 may be a telecommunications network. The telecommunications network may include at least one of a computer network, the internet, the Internet of things, and a telephone network.

The server 200 may collect a user's viewing history by receiving the user's viewing history of the display device 100 from the display device 100, determine a user's favorite channel according to the collected user's viewing history, determine a favorite channel group based on the determined user's favorite channel, and transfer information about the determined favorite channel group to the display device 100.

Also, the server 200 may collect information about viewing rates of other users and transfer the collected viewing rate information to the display device 100.

Referring to FIG. 2, the server 200 may include a controller 210 and a communicator 220.

The communicator 220 may receive information about a user's viewing history from the display device 100.

The controller 210 may control the communicator 220 to determine a favorite channel group based on the user's viewing history information received from the display device 100 and transfer the determined favorite channel group information to the display device 100.

According to an exemplary embodiment, the controller 210 may collect information about viewing rates of other users the collected viewing rate information to the display device 100 or determine a favorite channel group based on the other user's viewing rate information and transfer information about the determined favorite channel group to the display device 100.

The controller 210 may include RAM that stores a signal or data input from outside the server 200 or is used as a storage area corresponding to various jobs performed in peripheral devices, ROM that stores a control program for controlling the peripheral devices, and a processor. The processor may be embodied by a SoC incorporating a core and a GPU. Also, the processor may include a plurality of processors.

In the user's favorite channel scanning system of FIG. 2, the display device 100 may be embodied by an analog TV, a digital TV, a 3D-TV, a smart TV, an LED TV, an OLED TV, a plasma TV, a monitor, or a smart phone, and one may understand that the present disclosure is not limited thereto.

Also, the user's favorite channel scanning system may further include a set-top box or an IP set-top box connected to the display device 100. The set-top box or IP set-top box may be a terminal including a communicator and a processor and connected to an external network, thereby providing a multimedia communications service.

According to an exemplary embodiment, the set-top box or an IP set-top box connected to the display device 100 may collect a user's viewing history by receiving the user's viewing history of the display device 100 from the display device 100, determine a user's favorite channel according to the collected user's viewing history, determine a favorite channel group based on the determined user's favorite channel, and transfer information about the determined favorite channel group to the display device 100.

In the user's favorite channel scanning system of FIG. 2, both the server 200 and the display device 100 are apparatuses that are operated with a communicator and a processor and may be referred to as electronic devices or computing apparatuses.

The control device 50 may include a communicator 51, the controller 52, and a user input interface 53.

The communicator 51 may transmit or receive signals with the display device 100 according to an exemplary embodiment. The communicator 51 may include a radiofrequency (RF) module capable of transmitting or receiving signals with the display device 100 according to an RF communication standard and an infrared (IR) module capable of transmitting or receiving signals with the display device 100 according to an IR communication standard. The control device 50 may transmit commands about power on/off, channel change, or volume shift to the display device 100 through the IR module.

The user input interface 53 may include a keypad, a channel shift button, a volume control button, a touch pad, or a touch screen. The user may input a command related to the display device 100 by manipulating the user input interface 53. When the user input interface 53 includes a hard key button, the user may input a command related to the display device 100 by pressing the hard key button. When the user input interface 53 includes a touch screen, the user may input a command related to the display device 10 by touching a soft key of the touch screen.

For example, the user input interface 53 may include four directional buttons or four directional keys. The four directional buttons or four directional keys may be used to control a window, an area, an application, or an item displayed on the display device 100. The four directional keys or buttons may be used to perform up, down, left, and right movements.

According to an exemplary embodiment, the controller 52 may transmit a signal indicating the detection of an input of the channel shift button from the user input interface 53 to the display device 100 through the communicator 51.

According to an exemplary embodiment, the controller 52 may transmit a signal indicating the detection of the long press input of a channel shift button from the user input interface 53 to the display device 100 through the communicator 51.

According to an exemplary embodiment, the controller 52 may transmit a signal indicating the release of the long press input of a channel shift button from the user input interface 53 to the display device 100 through the communicator 51.

The control device 50 is capable of controlling the functions of the display device 100 and may be embodied in various ways.

According to an exemplary embodiment, the control device 50 may be embodied by a remote controller in which the user input interface 53 includes four directional buttons or four directional keys. The four directional buttons or four directional keys may be used to control a window, an area, an application, or an item displayed on the display device 100. The four directional keys or buttons may be used to perform up, down, left, and right movements.

According to an exemplary embodiment, the control device 50 may be embodied by a remote controller in which the user input interface 53 includes a touch pad. The control device 50 according to an exemplary embodiment may receive a user input of dragging, touching, or flipping through the touch pad. Also, the display device 100 may be controlled according to the type of a received user input, for example, a direction in which a drag command is input or a duration time of a touch command input.

According to an exemplary embodiment, the control device 50 may be embodied by a pointing device including a gyro sensor or an acceleration sensor. The gyro sensor may sense information about a motion of the control device 50. For example, the gyro sensor may sense information about a motion of the control device 50 with respect to the x, y, and z axes. The acceleration sensor may sense information about a movement speed of the control device 50. The control device 50 may further include a distance measurement sensor so that a distance from the display device 100 may be sensed.

According to an exemplary embodiment, the control device 50 may be embodied by a pointing device including all of the four directional keys, the touch pad, and the gyro sensor, and the acceleration sensor. In other words, when the control device 50 is embodied by a pointing device, the functions of the display device 100 may be controlled according to an inclination direction or angle of the gyro sensor of the control device 50.

Figure 3A:
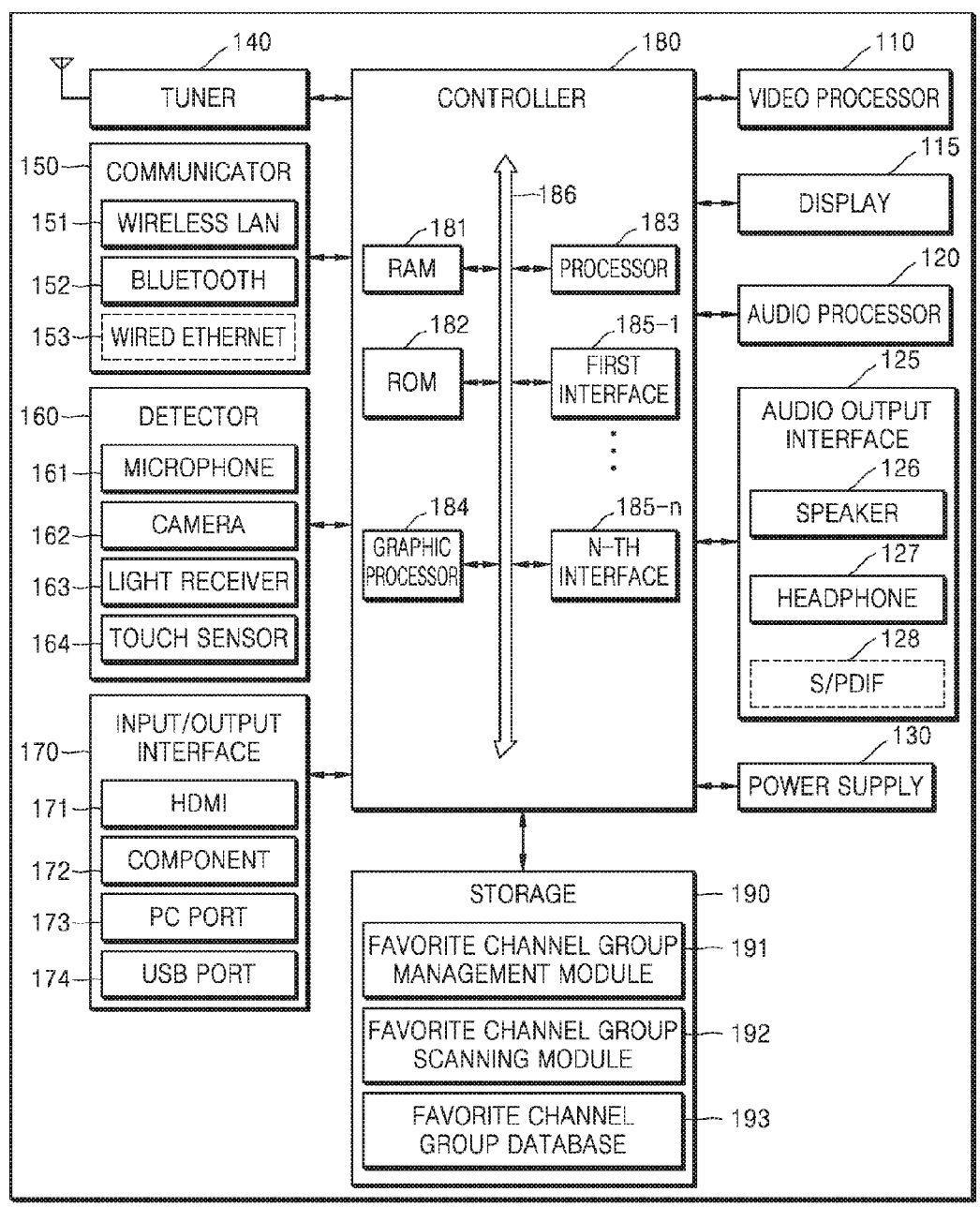
FIG. 3A is a block diagram of a display device according to an exemplary embodiment.

FIG. 3A is a block diagram of the display device 100 according to an exemplary embodiment.

Referring to FIG. 3A, the display device 100 may include a video processor 110, the display 115, an audio processor 120, an audio output interface 125, a power supply 130, a tuner 140, the communicator 150, the detector 160, an input/output interface 170, the controller 180, and a storage 190 (e.g., memory).

The video processor 110 processes video data received by the display device 100. The video processor 110 may perform various image processing such as decoding, scaling, noise filtering, frame rate conversion, and resolution change with respect to the video data.

The display 115 displays, on a screen, video included in a broadcast signal received through the tuner 140 under the control of the controller 180. Also, the display 115 may display content, for example, a moving picture, input through the communicator 150 or the input/output interface 170. The display 115 may output an image stored in the storage 190 under the control of the controller 180. Also, the display 115 may display a voice user interface (UI), for example, a voice command guide, for performing a voice recognition task corresponding to voice recognition or a motion UI, for example, a user motion guide for motion recognition, for performing a motion recognition task corresponding to motion recognition.

According to an exemplary embodiment, the display 115 may output a broadcast signal received from a channel by decreasing a channel change seed in a channel section corresponding to the favorite channel group, under the control of the controller 180.

According to an exemplary embodiment, the display 115 may output only a channel number on a black screen without outputting a broadcast signal received from the channel by increasing the channel shift speed in the general channel section not the channel section corresponding to the favorite channel group, under the control of the controller 180.

The audio processor 120 processes audio data. The audio processor 120 may perform various processing such as decoding, amplifying, and noise filtering with respect to the audio data. The audio processor 120 may include a plurality of audio processing modules for processing audio corresponding to a plurality of contents.

The audio output interface 125 outputs audio included in a broadcast signal received through the tuner 140, under the control of the controller 180. The audio output interface 125 may output audio, for example, voice or sound, input through the communicator 150 or the input/output unit 170. Also, the audio output interface 125 may output audio stored in the storage 190 under the control of the controller 180. The audio output interface 125 may include at least one of a speaker 126, a headphone output terminal 127, and a Sony/Philips digital interface (S/PDIF) output terminal 128. The audio output interface 125 may include a combination of the speaker 126, the headphone output terminal 127, and the S/PDIF output terminal 128.

The audio output interface 125 according to an exemplary embodiment may output, under the control of the controller 180, a voice message of "Scanning a favorite channel group is started" or sound of a particular note to inform the user that the operation of scanning a favorite channel group is started, when the long press input of a channel shift button by the control device 50 is detected.

The power supply 130 supplies electric power from an external power source to the elements 110 to 190 of the display device 100, under the control of the controller 180. Also, the power unit 130 may supply electric power output from one or more batteries located inside the display device 100 to the elements 110 to 190, under the control of the controller 180.

The tuner 140 may perform signal processing on the broadcast signal received in a wired or wireless manner through amplification, mixing, or resonance, and tune and select only a frequency of a channel to be received by the display device 100 among numerous frequency components of received broadcast signals. The broadcast signal may include audio, video, and additional information, for example, an electronic program guide (EPG).

The tuner 140 may receive a broadcast signal in a frequency range corresponding to a channel number, for example, cable broadcasting #506, according to a user input, for example, a control signal received from the control device 50, such as, a channel number input signal, a channel up/down input signal, and a channel input signal on an EPG screen.

The tuner 140 may receive a broadcast signal from various sources such as terrestrial broadcasting, cable broadcasting, satellite broadcasting, and Internet broadcasting. The tuner 140 may receive a broadcast signal from a source such as analog broadcasting or digital broadcasting. The broadcast signal received through the tuner 140 is decoded, for example, audio-decoded, video-decoded, or additional information-decoded, into audio, video, and/or additional information. The split audio, video, and/or additional information may be stored in the storage 190, under the control of the controller 180.

According to an exemplary embodiment, the tuner 140 may scan, under the control of the controller 180, the favorite channel group in response to the detection of the long press input of a channel shift button of the control device 50.

According to an exemplary embodiment, the tuner 140 may decrease a channel frequency tuning speed according to a control signal of the controller 180 to decrease a channel shift speed in the favorite channel group section corresponding to the favorite channel group.

According to an exemplary embodiment, the tuner 140 may increase the channel frequency tuning speed according to a control signal of the controller 180 to increase the channel shift speed in the general channel section other than the favorite channel group section.

The tuner 140 of the display device 100 may be one or plural tuners. The tuner 140 may be embodied in an all-in-one type with the display device 100 or as a separate apparatus having a tuner electrically connected to the display device 100, for example, a set-top box or a tuner connected to the input/output unit 170.

The communicator 150 may connect the display device 100 to external apparatuses, for example, an audio apparatus, under the control of the controller 180. The controller 180 may transmit/receive content with respect to the external apparatuses connected via communicator 150, download applications from the external apparatuses, or enable web browsing. The communicator 150 may include one of a wireless LAN 151, Bluetooth 152, and wired Ethernet 153 according to the performance and structure of the display device 100. Also, the communicator 150 may include a combination of the wireless LAN 151, the Bluetooth 152, and the wired Ethernet 153. The communicator 150 may receive the control signal of the control device 50, under the control of the controller 180. The control signal may be embodied in a Bluetooth signal, an RF signal, or a Wi-Fi signal.

The communicator 150 may further include other short-range communications, for example, near field communication (NFC) or Bluetooth low energy (BLE), in addition to the Bluetooth.

The communicator 150 according to an exemplary embodiment may transmit information about the user's viewing history to the server 200, and receive information about the determined favorite channel group from the server 200 according to the user's viewing history.

The communicator 150 according to an exemplary embodiment may receive, from the server 200, viewing rate information about other users or information about the favorite channel group determined based on the viewing rate information about other users.

The detector 160 detects voice, an image, or an interaction of a user.

A microphone 161 receives uttered sound of a user. The microphone 161 may convert the received sound to an electric signal and outputs the electric signal to the controller 180. The user voice may include, for example, voice corresponding to a menu or function of the display device 100. It is recommended that a recognition range of the microphone 161 is within 4 m from the microphone 161 to a user position. The recognition range of the microphone 161 may vary according to the volume of user voice and a surrounding environment, for example, speaker sound or surrounding noise.

The microphone 161 may be embodied in an integrated form or a separated from with respect to the display device 100. The microphone 161 in the separated form may be electrically connected to the display device 100 via the communicator 150 or the input/output interface 170.

It may be understood that the microphone 161 is excluded according to the performance and structure of the display device 100.

A camera 162 receives an image, for example, continuous frames, corresponding to the motion of a user including gesture in a camera recognition range. For example, the recognition range of the camera 162 may be a distance of about 0.1~5 m from the camera 162 to the user. The user motion may include, for example, motions of a user or a part of the body of a user, such as, a face, a facial expression, a hand, a fist, and a finger. The camera 162 may convert an image received under the control of the controller 180 to an electric signal and output the electric signal to the controller 180.

The controller 180 may select a menu displayed on the display device by using a received result of the motion recognition or perform control corresponding to the motion recognition result. For example, the motion may include channel control, volume control, and movement of a cursor.

The camera 162 may include a lens and an image sensor. The camera 162 may support optical zoom or digital zoom by using a plurality of lenses and image processing. The recognition range of the camera unit 162 may be set in various easy according to the angle of a camera and surrounding environment conditions. When the camera 162 includes a plurality of cameras, a 3D still image or a 3D motion may be received by using the cameras.

The camera 162 may be embodied in an integrated form or a separate form with respect to the display device 100. A separated apparatus including the camera 162 in a separated form may be electrically connected to the display device 100 via the communicator 150 or the input/output unit 170.

The camera 162 according to an exemplary embodiment may recognize a user by capturing an image of the user watching a TV. Recognized user information may be used when the controller 180 determines a user's favorite channel according to a user's viewing history for each user. For example, when the number of members of family is three, the camera 162 may recognize face of each of the three family members and determine a favorite channel group for the respective three family members.

It may be understood that the camera 162 is excluded according to the performance and structure of the display device 100.

A light receiver 163 receives a light signal including a control signal received from an external controller through a light window in a bezel of the display 115. The light receiver 163 may receive, from the control device 50, a light signal corresponding to a user input, for example, touching, pressing, a touch gesture, voice, or a motion. A control signal may be extracted from the received light signal under the control of the controller 180.

According to an exemplary embodiment, the light receiver 163 may detect a signal of pressing the channel up button 53*a* or the channel down button 53*b* of the channel shift button of the control device 50.

According to an exemplary embodiment, the light receiver 163 determines whether a duration time of pressing the channel shift button of the control device 50 exceeds a predetermined value and, if not exceeding the predetermined value, determines the pressing to be a general pressing of the channel shift button. Also, if the duration time of pressing the channel shift button of the control device 50 exceeds the predetermined value, the light receiver 163 may detect the pressing to be the long press input of the channel shift button. The predetermined value of the duration time of pressing the channel shift button, which may be used as a standard for determining the pressing to be a long press input, may be variously determined to be, for example, one second or two seconds.

A touch sensor 164 may detect a user's touch input on the touch sensor and transmit the detected touch input to the controller 180. The touch sensor 164 may be embodied by a touch sensor TV display by being coupled to the display 115 in layers.

According to an exemplary embodiment, a channel shift button is displayed on the touch sensor TV display and, when a user touches the displayed channel shift button, the touch sensor 164 may detect a channel shift button input signal.

The input/output interface 170 receives, under the control of the controller 180, video, for example, a moving picture, audio, for example, voice or music, and additional information, for example, EPG, from the outside of the display device 100. The input/output interface 170 may include one of a high-definition multimedia interface (HDMI) port 171, a component jack 172, a PC port 173, and a USB port 174. The input/output interface 170 may include a combination of the HDMI port 171, the component jack 172, the PC port 173, and the USB port 174.

It may be understood that the structure and operation of the input/output interface 170 may be variously embodied according to one or more exemplary embodiments.

The controller 180 controls the overall operation of the display device 100 and a signal flow between the elements 110 to 190 of the display device 100, and performs a data processing function. When there is a user input or a preset stored condition is met, the controller 180 may execute an operation system (OS) and various applications stored in the storage 190.

The controller 180 may include RAM 181 that stores a signal or data input from outside the display device 100 or is used as a storage area corresponding to various jobs performed by the display device 100, ROM that stores a control program for controlling the display device 100, and a processor 183. The processor may be embodied by a SoC incorporating a core and a GPU. Also, the processor may include a plurality of processors.

The processor 183 may include a graphic processing unit for graphic processing corresponding to video. The processor 183 may be embodied by as SoC incorporating a core and a GPU. Also, the processor 183 may include a plurality of processors.

A graphic processor 184 may generate a screen image including various objects such as an icon, an image, and text by using a calculator and a renderer.

First to n-th interfaces 185-1 to 185-*n* are connected to the above-described various elements. One of the interfaces may be a network interface that is connected to an external apparatus via a network.

The RAM 181, the ROM 182, the processor 183, the graphic processor 184, and the first to n-th interfaces 185-1 to 185-*n* may be connected to one another via an internal bus 186.

According to an exemplary embodiment, the term "the controller of a display device" may include the processor 183, the ROM 182, and the RAM 181.

According to an exemplary embodiment, the controller 180 may manage user's TV view history by using a favorite channel group management module 191 stored in the storage 190. The controller 180 may store, in a favorite channel group database 193 of the storage 190, program information and the channel number of a broadcast signal selected by the tuner 140 according to the control signal of the control device 50 input by the user, and manage the stored program information and the channel number of a broadcast signal. The controller 180 may manage information about program/channel viewed by the user, for example, for one week, and grade each program/channel viewed by the user and manage a certain program/channel as a user's favorite channel when the grade of a program/channel is over, for example, a certain point.

According to an exemplary embodiment, the controller 180 may determine the favorite channel group by using the favorite channel group management module 191 based on the viewing rate information of other users received from the server 200.

According to an exemplary embodiment, the controller 180 may scan the determined favorite channel group by using the favorite channel group management module 191, in response to the detection of the long press input of a channel shift button of the control device 50, by using a favorite channel group scanning module 192 stored in the storage 190.

According to an exemplary embodiment, the controller 180 may decrease the channel shift speed in the favorite channel group section corresponding to the favorite channel group and increase the channel shift speed in a section other than the favorite channel group section, by using the favorite channel group scanning module 192 stored in the storage 190, during scanning of the favorite channel group.

According to an exemplary embodiment, the controller 180 may manage the favorite channel group for each user by using a result of the recognition of users using the camera 162.

It may be understood that the structure and operation of the controller 180 is variously embodied according to exemplary embodiments.

The storage 190 may store various pieces of data, programs, or applications to drive and control the display device 100, under the control of the controller 180. The storage 190 may store data or signals input/output corresponding to driving of the video processor 110, the display 115, the audio processor 120, the audio output unit 125, the power supply 130, the tuner 140, the communicator 150, the detector 160, and the input/output interface 170. The storage 190 may store a control program for controlling the display device 100 and the control device 50, an application originally provided by a manufacturer or downloaded from the outside, a GUI related to the application, an object to provide the GUI, for example, image text, icons, or buttons, user information, documents, databases, or related data.

According to an exemplary embodiment, the term "storage" may include the storage 190, the ROM 182 and the RAM 181 of the controller 180, or a memory card, for example, a micro SD card or a USB memory, provided in the display device 100. Also, the storage 190 may include non-volatile memory, volatile memory, hard disk drives (HDDs), or solid state drives (SSDs).

The storage 190 may include a broadcast receiving module, a channel control module, a volume control module, a communication control module, a voice recognition module, a motion recognition module, a light receiving module, a display control module, an audio control module, an external input control module, a power control module, a power control module of an external apparatus connected in a wireless manner, for example, Bluetooth, a voice database (DB), or a motion DB. The controller 180 may perform the above respective functions by using software programs stored in the storage 190.

Each of the modules includes commands to perform various functions provided by portable devices. The functions of modules may be intuitively guessed from their names.

According to an exemplary embodiment, the storage 190 may store the user's favorite channel group database 193 according to the user's viewing history.

According to an exemplary embodiment, the storage 190 may include the favorite channel group management module 191 that manages the user favorite channel group determined from the user's favorite channel determined according to the user's viewing history.

The favorite channel group management module 191 may include one or more commands to determine a favorite channel according to the user's viewing history, one or more commands to determine at least one of other channels having properties corresponding to a favorite channel determined by using metadata of the determined favorite channel, and one or more commands to determine a favorite channel group including the determined favorite channel and the determined at least one of other channels.

According to an exemplary embodiment, the storage 190 may include the favorite channel group scanning module 192 for scanning a favorite channel group in response to the detection of the long press input of a channel shift button of the control device 50.

The favorite channel group scanning module 192 may include one or more commands to decrease the channel shift speed in the favorite channel group section corresponding to the determined favorite channel group and increase the channel shift speed in a section other than the favorite channel group section, during the scanning of a favorite channel group.

Also, the favorite channel group scanning module 192 may further include one or more commands to increase the channel shift speed as the duration time of the long press input of a channel shift button of the control device 50 extends.

Also, the favorite channel group scanning module 192 may further include one or more commands to select a favorite channel located nearest in a scanning direction, when the long press input of a channel shift button of the control device 50 ends.

As described above, the server 300 may store and manage the user favorite program database according to the user's viewing history.

At least one of elements may be added to or removed from the elements, for example, the elements 110 to 190, of the display device 100 of FIG. 3A, according to the performance of the display device 100. Also, it may be understood that the positions of the elements, for example, the elements 110 to 190, are changed according to the performance or structure of the display device 100.

Figure 3B:
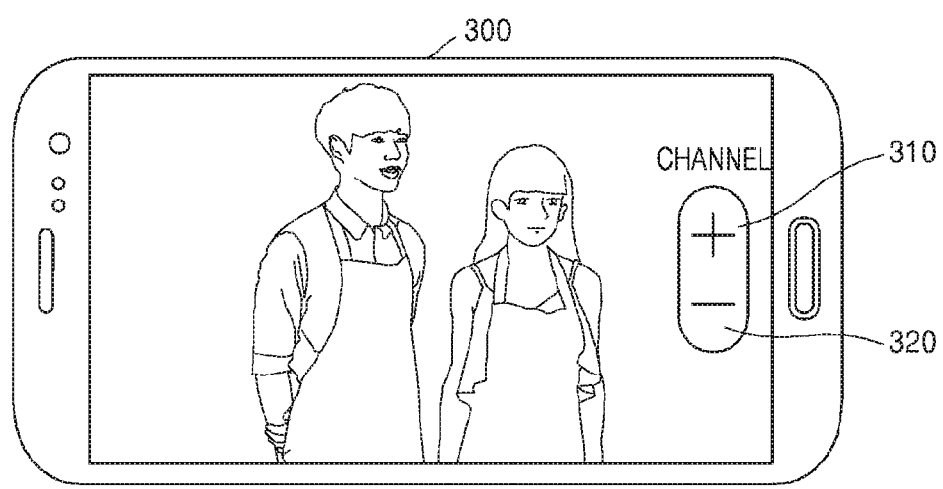
FIG. 3B illustrates an example of the display device being embodied in a mobile device, according to an exemplary embodiment.

FIG. 3B illustrates an example of the electronic device according to an exemplary embodiment being embodied in a mobile device 300 such as a smartphone.

Referring to FIG. 3B, a channel up button 310 and a channel down button 320 may be displayed as a channel shift button on a touch sensitive display of the mobile device 300. A user may sequentially change channels by touching once the channel up button 310 or channel down button 320 using an input device such as a finger. Also, the user may trigger a scanning operation of a favorite channel group by long touching the channel up button 310 or the channel down button 320 using an input device such as a finger.

Figure 4:
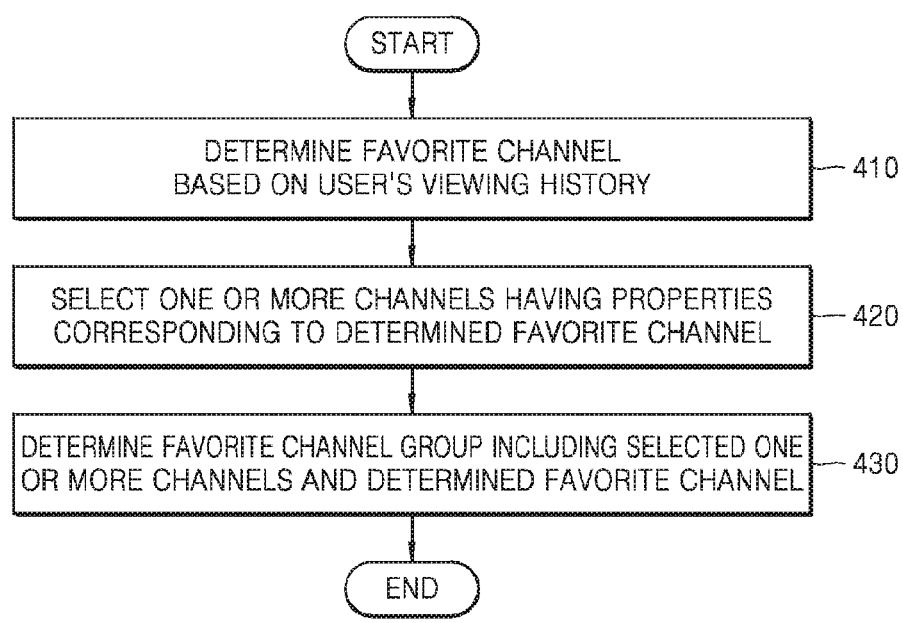
FIG. 4 is a flowchart of a method of determining a favorite channel group based on a user's viewing history, according to an exemplary embodiment.

FIG. 4 is a flowchart of a method of determining a favorite channel group based on a user's viewing history, according to an exemplary embodiment.

Referring to FIG. 4, in Operation 410, the display device 100 determines a favorite channel according to the user's viewing history.

The display device 100 may extract a favorite channel based on a channel number and viewing time that the user directly input for a certain period. For example, the display device 100 may determine a channel number satisfying conditions to be a favorite channel. The conditions may be the number of channel inputs and the viewing time of the channel, for example, whether the channel numbers have been input over a certain number of times and whether the channel number has been viewed over a certain time.

In detail, the controller 180 of the display device 100 may determine a history of broadcast channels viewed by the user by monitoring a broadcast signal corresponding to a channel number selected by the tuner 140 based on a user input. The display device 100 may determine a user's favorite channel according to the user's viewing history.

The display device 100 according to an exemplary embodiment may determine the user's favorite channel by anticipating a channel favored by the user by analyzing a user's viewing pattern based on data of the user's viewing history collected by monitoring TV broadcast channels. To this end, the display device 100 may use an appropriate learning algorithm based on machine learning. Machine learning refers to a technical field in which a computer is trained to recognize a pattern based on previously accumulated data. The learning algorithm is not limited to a particular algorithm. For example, if a pattern of a user viewing a program of a specific channel between 10 pm to 11 pm every Monday, three or more times for one month is recognized, it may be determined that the user favors the specific channel so that the specific channel is determined to be a user's favorite channel.

The display device 100 according to an exemplary embodiment may determine a user's favorite channel according to a user's frequent view history.

The display device 100 according to an exemplary embodiment may determine a user's favorite channel according to a user's recent view history.

The display device 100 according to an exemplary embodiment may determine a user's favorite channel considering both the user's frequent view history and the user's frequency view history.

An example in which the display device 100 determines a user's favorite channel according to a user's frequent view history is described.

The display device 100 may manage the user's viewing history in the form shown in Table 1. The display device 100 manages programs viewed by a user for each date and time. The display device 100 stores a program that is viewed at least once in a database and scores each program according to the viewing frequency. For example, the score of a SBS channel is 3, the score of a History channel is 2, the score of a Nat Geo Wild channel is 5, and the score of a Discovery channel is 4.

TABLE 1

| | SBS CHANNEL | HISTORY CHANNEL | NAT GEO WILD CHANNEL | DISCOVERY CHANNEL |
|---|---|---|---|---|
| SCORE | 3 | 2 | 5 | 4 |

For example, the score may be increased by 1 whenever a user views a program of a certain channel.

According to an exemplary embodiment, the display device 100 may assign a channel having a score over a certain value to be a user's favorite channel.

The display device 100 may recognize a user who views an image displayed on the display device 100 by using a camera attached thereto, and manage the score of a user's favorite channel for each recognized user.

According to an exemplary embodiment described with reference to Table 1, when a user's favorite channel is determined according to the user's viewing history, the score is determined based on the viewing frequency by the user. However, the user's favorite channel may be determined in various ways in addition to the use of scores calculated based on the viewing frequency.

According to an exemplary embodiment, a channel that has been frequently viewed in a recent period may be determined to be a user's favorite channel. For example, besides the score indicating the viewing frequency for each channel, data showing a passage of time after viewing a channel is further provided so that the score of a channel that has not been viewed long because the last view may be set to be, for example, 0.

In Operation 420, the display device 100 selects one or more channels having properties related to the determined favorite channel. One or more channels having properties related to a favorite channel may include one or more channels having properties corresponding to a favorite channel or one or more channels having properties similar to those of a favorite channel.

In Operation 430, the display device 100 determines a favorite channel group including one or more selected channels and the determined favorite channel. According to an exemplary embodiment, the favorite channel group may include channels having consecutive numbers, but is not limited thereto, and the channels included in the favorite channel group may be discretely distributed in a channel list. According to an exemplary embodiment, the favorite channel group may include only one channel.

The display device 100 according to an exemplary embodiment may periodically update the collected user's viewing history and the determined favorite channel group. For example, the display device 100 may update the determined favorite channel group every one week or every one month.

The display device 100 according to an exemplary embodiment may determine at least one of other channels having properties corresponding to the determined favorite channel by using metadata of the favorite channel determined in Operation 410.

The metadata of each channel may include various pieces of information about the channel, for example, genre, a viewer age group, a broadcast provider of each channel.

The display device 100 may select one or more of other channels having the same properties as the one or more pieces of information of the metadata of the determined favorite channel.

The display device 100 according to an exemplary embodiment may determine channels having the same genre as that of the determined favorite channel to be a favorite channel group, by using the genre information of the metadata of the determined favorite channel.

The display device 100 according to an exemplary embodiment may determine channels having the same viewer age group as that of the determined favorite channel to be a favorite channel group, by using the viewer age group of the metadata of the determined favorite channel.

The display device 100 according to an exemplary embodiment may extract a user's favorite genre from the user's viewing history, without determining a favorite channel from the user's viewing history. The display device 100 may determine channels mapped with an extracted favorite genre to be a favorite channel group.

generate a favorite channel group for each user based on the viewing history information collected for each user. Accordingly, when a user watches a TV, the display device 100 recognizes the user by using a camera and then provides favorite channel group scanning by using a favorite channel group generated for the user who currently watches a TV.

For example, when father of family members is recognized to be watching a TV, the display device 100 may be embodied to scan a "news" favorite channel group generated for the father when the father performs favorite channel scanning. When mother of family members is recognized to be watching a TV, the display device 100 may be embodied to scan a "drama" favorite channel group generated for the mother when the mother performs favorite channel scanning.

According to another embodiment, the display device 100 may generate a favorite channel group considering viewing histories of other users who watch a TV.

The display device 100 may collect viewing history information regardless of users who watch a TV installed at home. The display device 100 may generate a favorite channel group considering all viewing histories of, for example, father, mother, and son, regardless of family members watching a TV.

According to another exemplary embodiment, the display device 100 may receive information about viewing histories of other users via a network and generate a favorite channel group based on the received information about other user's viewing histories.

TABLE 2

USER'S VIEWING HISTORY

| | | | Genre | | | | |
|---|---|---|---|---|---|---|---|
| | Movie | News/ Entertainment | Documentary | Documentary | Documentary | Documentary | News/ Entertainment |
| CHANNEL ID | CGV CHANNEL | SBS CHANNEL | History CHANNEL | Nat Geo Wild CHANNEL | Discovery CHANNEL | National Geographic CHANNEL | MBC CHANNEL |
| Score | 6 | 3 | 2 | 5 | 4 | 3 | 2 |

For example, referring to Table 2, when the display device 50 determines a channel that is most frequently viewed to be a favorite channel, a CGV channel having the highest score of 6 may be determined to be a favorite channel. If the genre of a CGV channel is "Movie", the display device 50 may determine channels corresponding to the genre "Movie" to be a favorite channel group.

However, when the display device 50 extracts a user's favorite genre from the viewing history, the determined favorite channel group may differ. When a favorite genre is extracted from the user's viewing history referring to Table 2, the score of a movie genre is 6, the score of a news/entertainment genre is 5 (=3+2), and the score of a documentary genre is 17 (=2+5+4+3). Because the documentary genre has the highest score, documentary may be extracted as a favorite genre. The display device 100 may determine channels corresponding to the documentary genre to be a favorite channel group.

The display device 100 according to an exemplary embodiment may generate a favorite channel group for each user by generating a user's viewing history for each user watching a TV.

The display device 100 may recognize users watching a TV by using the camera 162 and then collect viewing history information for each user. The display device 100 may The user may wish to watch broadcasting of recently popular channels or channels having a high viewing rate, rather than his/her own viewing history. Accordingly, the display device 100 may receive information about a channel having a high viewing rate watched by a plurality of users from the server 100 through the network 250 of FIG. 2. The display device 100 may receive information about a channel having a high viewing rate from the server 200 and generate a favorite channel group based on the received information or receive information about a genre having a high viewing rate and generate a favorite channel group based on the received information. The display device 100 may periodically receive the information about a channel having a high viewing rate or the information about a genre having a high viewing rate, from the server 200.

The server 200 may include a server provided by a broadcast provider, a server for searching a viewing rate, and a server for providing content.

As such, as the display device 100 receives information about other user's viewing rates from the server 200 via the network 250 and generates a favorite channel group based on the received information about other user's viewing rates, the user may check broadcast programs of channels recently favored by other users.

Figure 5:
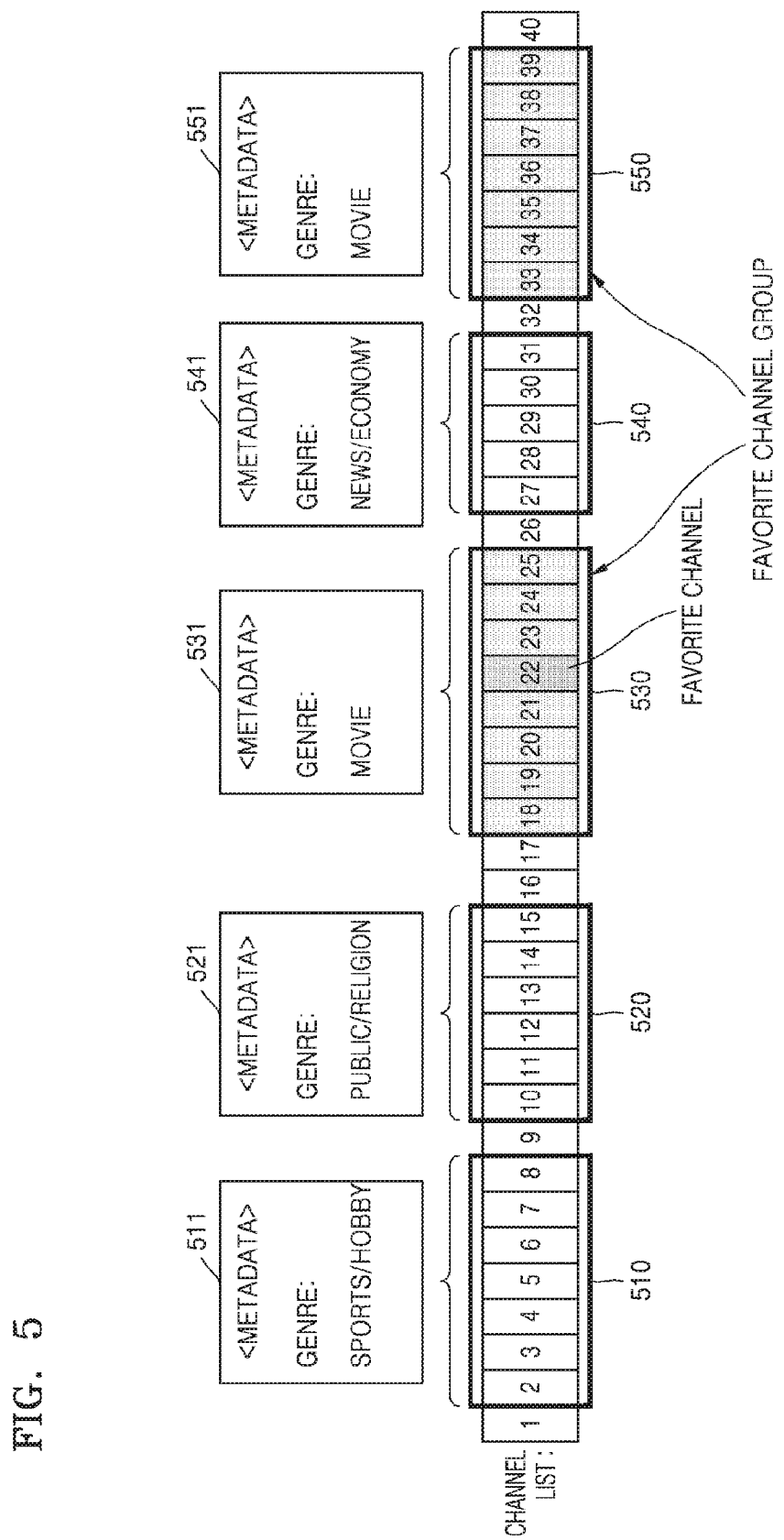
FIG. 5 is a reference view illustrating selecting a favorite channel group, according to an exemplary embodiment.

FIG. 5 is a reference view illustrating selecting a favorite channel group, according to an exemplary embodiment.

Referring to FIG. 5, a channel list may include Channel "1" to Channel "40". A channel group 510 from Channel "2" to Channel "8" has metadata 511 including "genre: sports/hobby". A channel group 520 from Channel "10" to Channel "15" has metadata 521 including "genre: public/religion". A channel group 530 from Channel "18" to Channel "25" has metadata 531 including "genre: movie". A channel group 540 from Channel "27" to Channel "31" has metadata 541 including "genre: news/economy". A channel group 550 from Channel "33" to Channel "39" has metadata 551 including "genre: movie".

In Operation 410 of FIG. 4, if the display device 100 determines Channel "22" to be a favorite channel, the display device 100 may select the channel group 530 including Channels "18-25." That is, other channels having the same genre as the genre "movie" of Channel "22." Also, the channels having the same genre may not have consecutive channel numbers but may be distributed in the channel list. Referring to FIG. 5, the channels having a movie genre exist not only in the channel group 530 but also in the channel group 550. Accordingly, the display device 100 may select the channel group 550 including Channels "33-39" having metadata of the genre "movie". The display device 100 may determine the selected channel groups 530 and 550 altogether to be a favorite channel group. As such, because channels are generally grouped in similar numbers according to particular properties, the display device 100 may determine a favorite channel group including consecutive channel numbers. Also, the display device 100 may group channels distributed throughout the channel list into a favorite channel group.

Figure 6:
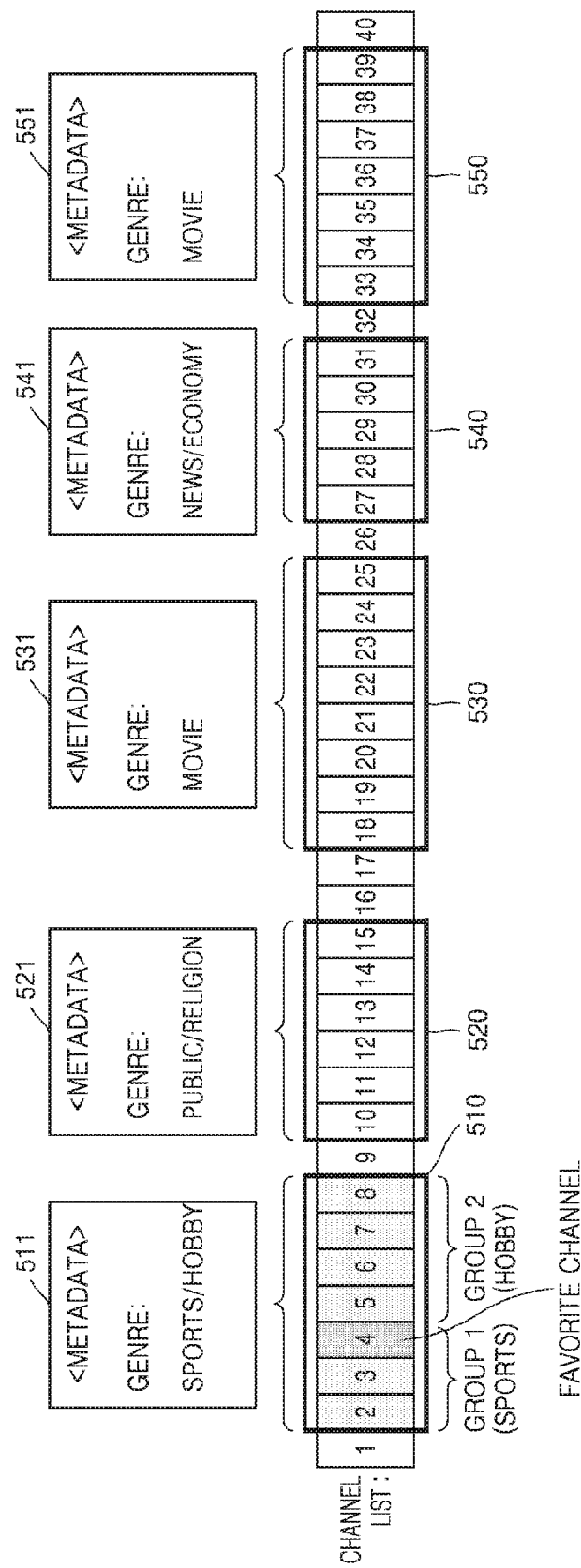
FIG. 6 is a reference view illustrating selecting a favorite channel group, according to an exemplary embodiment.

FIG. 6 is a reference view illustrating selecting a favorite channel group, according to an exemplary embodiment.

Referring to FIG. 6, if in Operation 410 the display device 100 determines Channel "4" to be a favorite channel, the display device 100 may select Channels "2-3" and Channels "5-8", that is, other channels having the same genre as the genre "sports/hobby" of Channel "4", and determine Channel "2-8" having metadata of a genre "sports/hobby" to be a favorite channel group.

Although the genres of Channel "2" to Channel "8" are identically "sports/hobby", the genre may be divided into sub-classes. For example, a group 1 of Channels "2-4", as a sub-class of the genre, is "sports" and a group 2 of Channels "5-8", as a sub-class of the genre, is "hobby". When Channel "4" is determined to be a favorite channel, the display device 50 may determine Channels "2-4" having the same sub-class as the sub-class genre "sports" of Channel "4" to be a favorite channel group, by using the sub-class of the genre included in the metadata.

Figure 7:
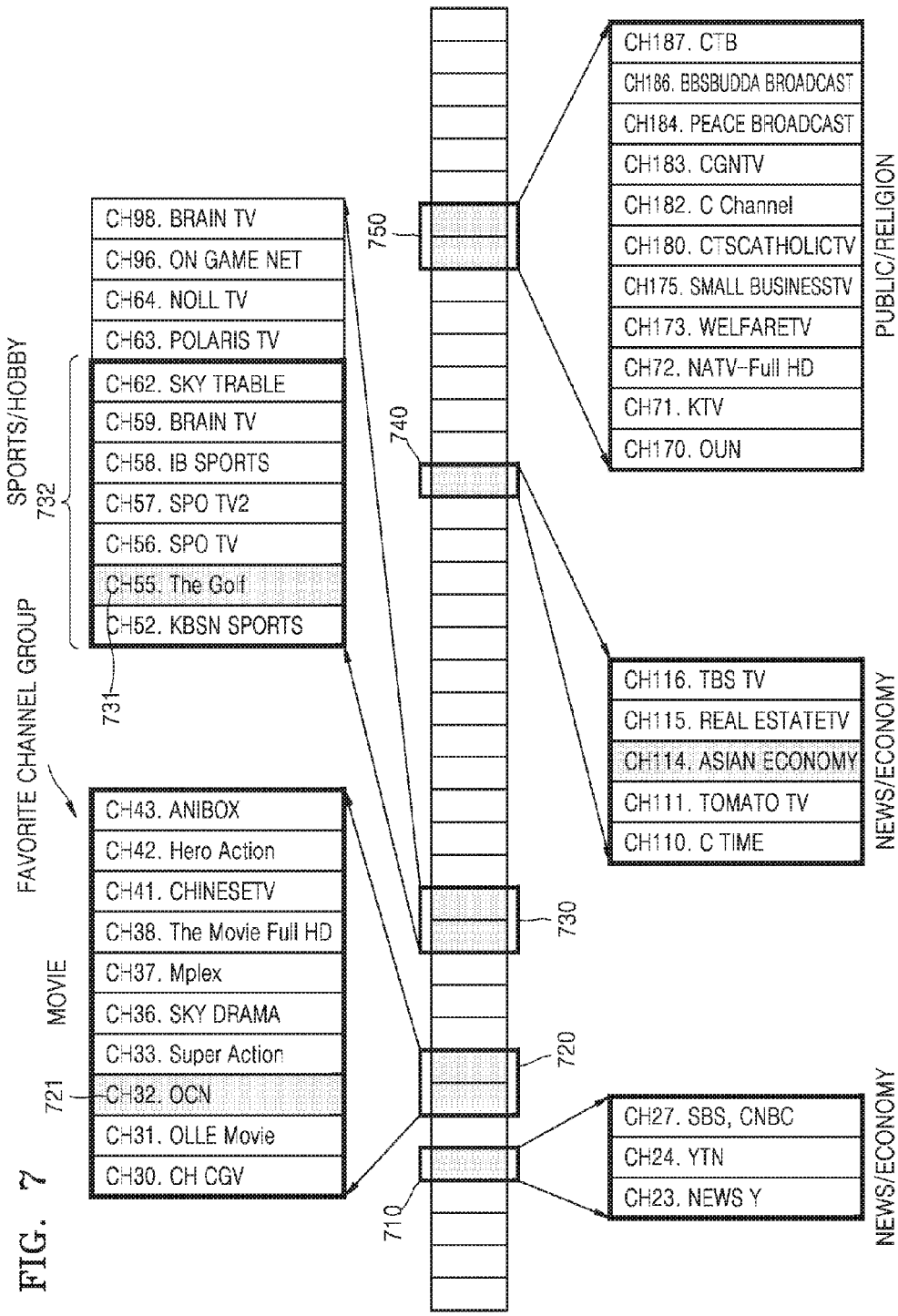
FIG. 7 is a reference view illustrating selecting a favorite channel group, according to an exemplary embodiment.

FIG. 7 is a reference view illustrating selecting a favorite channel group, according to an exemplary embodiment.

Referring to FIG. 7, if in Operation 410 the display device 100 determines Channel "32" (721), Channel "55" (731), and Channel "24" to be favorite channels, the display device 100 selects other channels having metadata corresponding to the determined favorite channels, e.g., channel groups 710, 720, 730, 740, and 750, For example, when the genre is used as metadata, because the genre of Channel "32" is "movie", the display device 100 may determine Channel "30" to Channel "43" having metadata of a genre "movie" to be a first favorite channel group.

Also, because the genre of Channel "55" is "sports/hobby" (732), the display device 100 determine Channel "52" to Channel "98" having metadata of a genre "sports/hobby" to be a second favorite channel group.

Also, because the genre of Channel "24" is "news/economy", the display device 100 may determine Channel "23" to Channel "27", and Channel "110" to Channel "116" having metadata of the genre "news/economy" to be a third favorite channel group.

Figure 8:
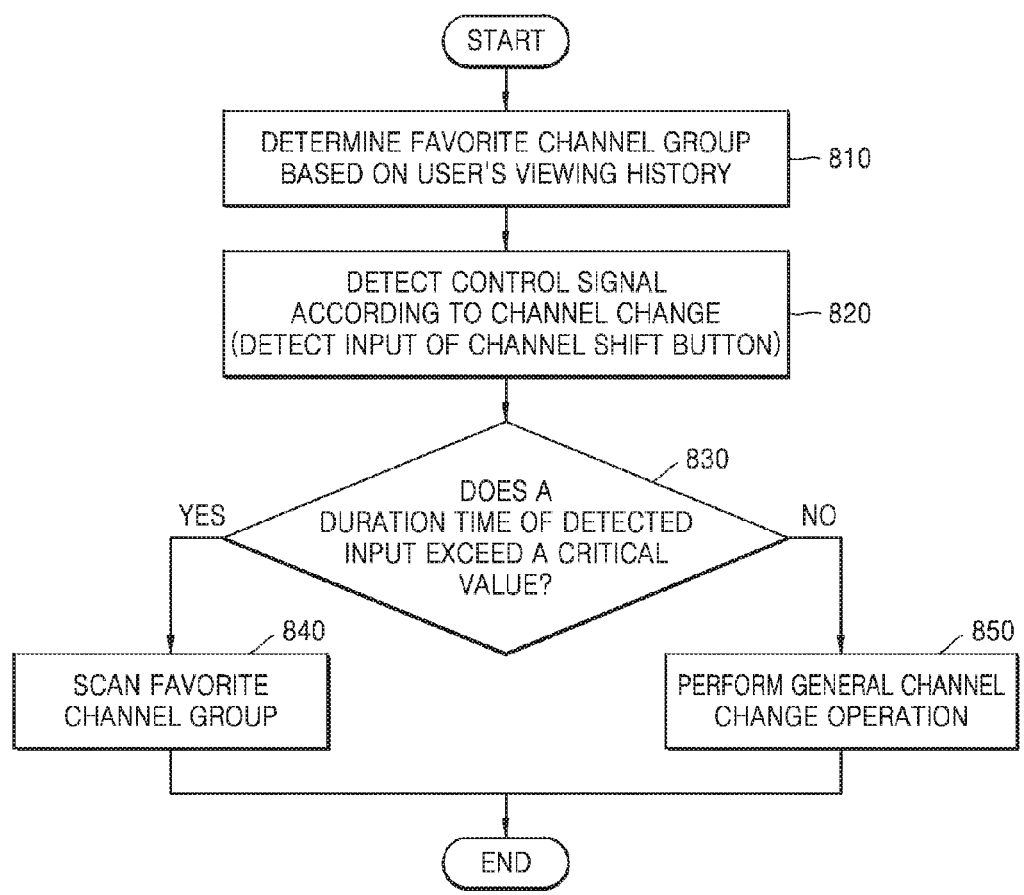
FIG. 8 is a flowchart of a method of scanning a favorite channel group according to an input of a channel shift button, according to an exemplary embodiment.

FIG. 8 is a flowchart of a method of scanning a favorite channel group according to an input of a channel shift button, according to an exemplary embodiment.

Referring to FIG. 8, in Operation 810, the display device 100 determines a favorite channel group according to the user's viewing history. The display device 100 may determine a favorite channel group through the operation of FIG. 4.

In Operation 820, the display device 100 detects a control signal according to a channel change.

For example, the user may control channel change of the display device 100 by pressing the channel up button 53a or the channel down button 53b of the control device 50, as illustrated in FIG. 1. As such, the light receiver 163 of the display device 100 may detect the control signal according to the pressing of the channel up button 53a or the channel down button 53. Also, the user may control the channel change by touching the channel up button 310 or the channel down button 320 arranged on a touch sensor TV screen, as illustrated in FIG. 3B.

In Operation 830, the display device 100 determines whether a duration time of a detected channel shift button input exceeds a predetermined value.

A user may shift to a next channel adjacent to a current channel by pressing the channel up button or the channel down button once at a preset time interval. The predetermined value denotes the preset time interval.

In Operation 850, if the display device 100 determines that the duration time of the detected channel shift button input does not exceed the predetermined value, a general channel change operation is performed.

Accordingly, when a channel up button input is detected, the display device 100 may tune a currently tuned channel to a next adjacent channel in a direction in which the channel number increases. Also, when the channel up button input is detected, the display device 100 may tune a currently tuned channel to a next adjacent channel in a direction in which the channel number decreases.

In Operation 840, if the display device 100 determines that the duration time of the detected channel shift button input exceeds the predetermined value, a favorite channel group is scanned.

If the display device 100 determines that the duration time of the detected channel shift button input exceeds the predetermined value, not the general channel change operation but a favorite channel group scanning operation is performed.

Figure 9:
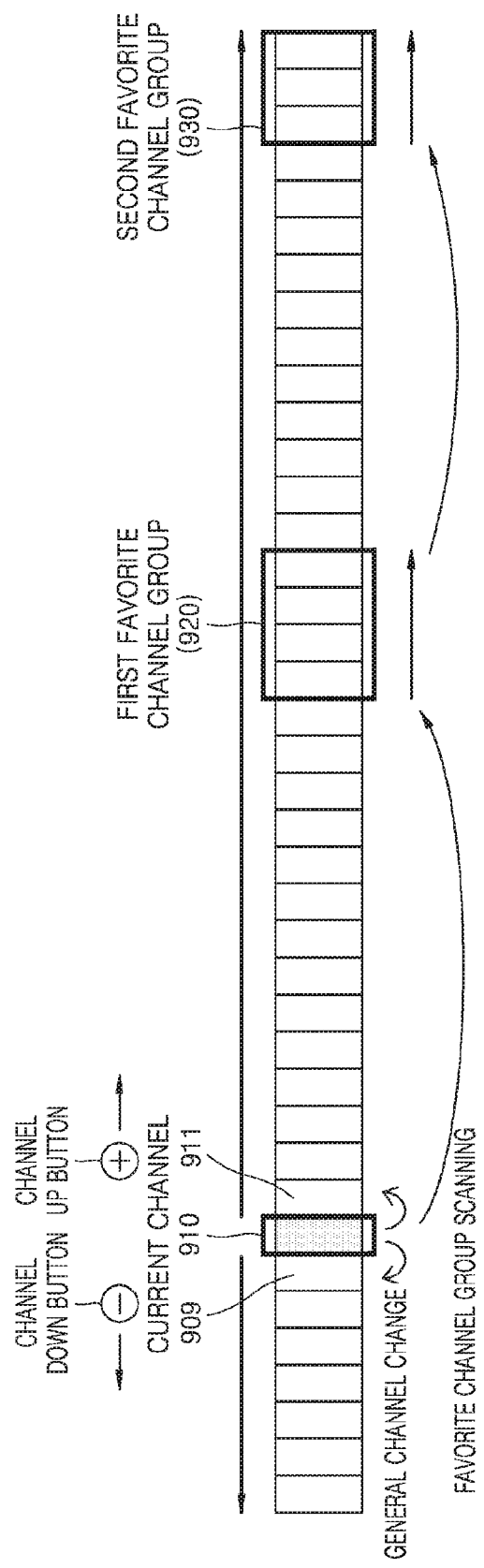
FIG. 9 is a reference view illustrating an operating method according to detection of a channel shift button input, according to an exemplary embodiment.

FIG. 9 is a reference view illustrating an operating method according to detection of a channel shift button input, according to an exemplary embodiment.

Referring to FIG. 9, the display device 100 is tuned to a current channel "910", an input of the channel up button 53a or the channel down button 53b of the control device 50 is detected and, if a duration time of the channel up button or channel down button input does not exceed the predetermined value, the general channel change operation is performed. Accordingly, when the display device 100 detects the channel up button input, the current channel "910" is changed to a channel "911" that is an adjacent channel in a direction in which the channel number increases. When the display device 100 detects the channel down button input, the current channel "910" is changed to a channel "909" that is an adjacent channel in a direction in which the channel number decreases. Accordingly, when the user presses the channel up/down buttons 53a and 53b of the control device 50 in a normal manner, the display device 100 performs a one channel up or one channel down change operation.

When the duration time of an input of the channel up button 53a or the channel down button 53b of the control device 50 exceeds the predetermined value, the display device 100 performs the favorite channel group scanning operation.

Referring to FIG. 9, the channel list includes a first favorite channel group 920 and a second favorite channel group 930, which are determined by the display device in advance. When the duration time of an input of the channel up button 53a of the control device 50 exceeds the predetermined time and thus the favorite channel group scanning operation is performed, the display device 100 performs the favorite channel group scanning operation in a direction in which the channel number increases from the current channel "910". Also, when the duration time of an input of the channel down button 53b of the control device 50 exceeds the predetermined value and thus the favorite channel group scanning operation is performed, the display device 100 performs the favorite channel group scanning operation in a direction in which the channel number decreases from the current channel "910".

For example, in FIG. 9, in the state of being tuned to the current channel "910", when the display device 100 performs the favorite channel group scanning operation as the duration time of the input of the channel up button 53a of the control device 50 exceeds the predetermined value, a favorite channel group is scanned in a rightward direction in which the channel number increases. Referring to FIG. 9, the display device 100 may scan the first favorite channel group 920 and the second favorite channel group 930 in the rightward direction in which the channel number increases.

Figure 10:
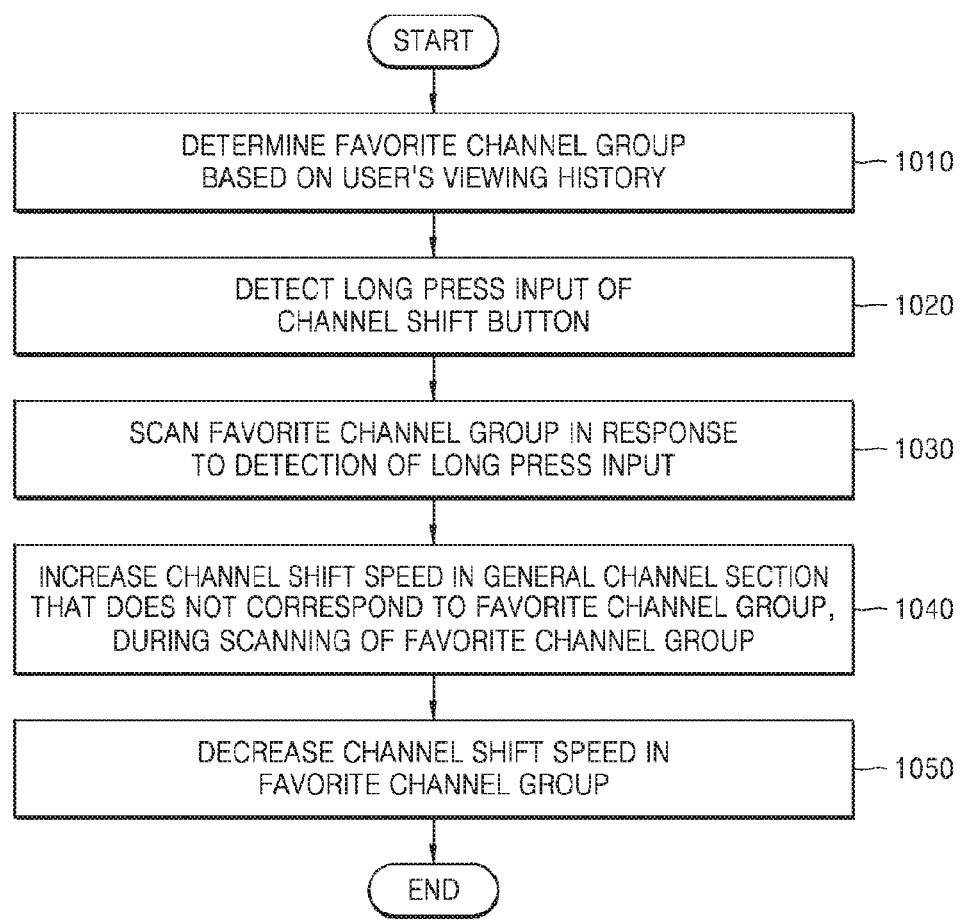
FIG. 10 is a flowchart of a method of scanning a favorite channel group according to a long press input of a channel shift button, according to an exemplary embodiment.

FIG. 10 is a flowchart of a method of scanning a favorite channel group according to a long press input of a channel shift button, according to an exemplary embodiment.

Referring to FIG. 10, in Operation 1010, the display device 100 determines a favorite channel group according to the user's viewing history. A method of determining a favorite channel group according to the user's viewing history, which is performed by the display device 100 may use the operation described with reference to FIG. 4.

In Operation 1020, the display device 100 detects the long press input of a channel shift button of the control device 50.

In Operation 1030, the display device 100 scans a favorite channel group in response to the detection of long press input.

In Operation 1040, during the scanning of a favorite channel group, the display device 100 increases a channel shift speed in the general channel section that does not correspond to the favorite channel group. The display device 100 may reduce time to approach the favorite channel group during scanning of the favorite channel group, by increasing the channel shift speed in the general channel section that does not correspond to the favorite channel group, and reduce time to watch channels that are not favored by the user, by quickly changing the general channel section that is less favored by the user.

In Operation 1050, the display device 100 decreases the channel change group in the favorite channel section corresponding to the favorite channel group. Because the display device 100 decreases the channel shift speed in the favorite channel group section corresponding to the favorite channel group, the user may select a desired channel by checking contents broadcasted on channels corresponding to the favorite channel group.

When the display device 100 according to an exemplary embodiment detects the end of the long press input of a channel shift button of the control device 50, the display device 100 may select the nearest favorite channel in the scanning direction from the current channel.

When the display device 100 according to an exemplary embodiment detects the end of the long press input of a channel shift button of the control device 50, the display device 100 selects the nearest favorite channel in the scanning direction from the current channel. If no favorite channel exists in the scanning direction, the nearest general channel in the scanning direction from the current channel may be selected.

Figure 11:
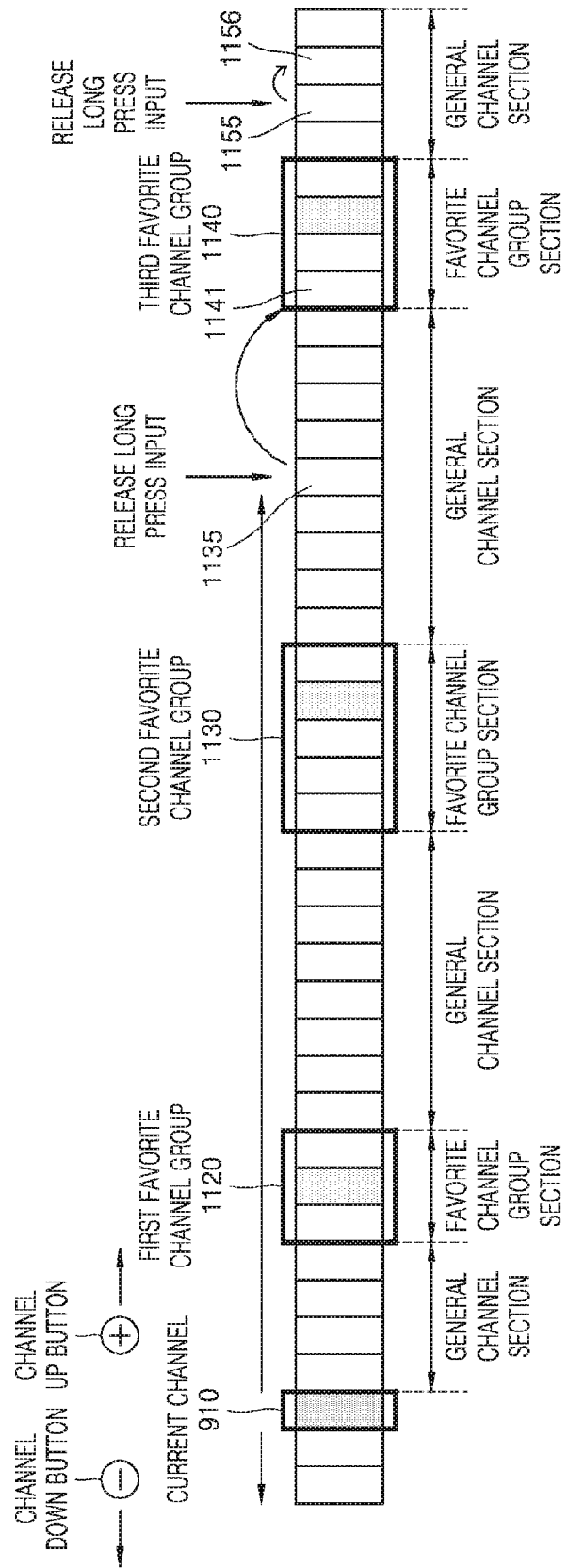
FIG. 11 is a reference view illustrating a method of performing a favorite channel scanning operation according to detection of a channel shift button input, according to an exemplary embodiment.

FIG. 11 is a reference view illustrating a method of performing a favorite channel scanning operation according to detection of the long press input of a channel shift button, according to an exemplary embodiment.

Referring to FIG. 11, a first favorite channel group 1120, a second favorite channel group 1130, and a third favorite channel group 1140 are present in the channel list in a direction in which the channel number increases from the current channel "910".

In the state in which the current channel "910" is tuned, when the long press input of the channel up button 53a of the control device 50 is detected, the favorite channel group is scanned in a direction in which the channel number increases. In this state, while the channel shift speed is increased in the general channel section, the channel shift speed may be decreased in the favorite channel group section corresponding to the favorite channel group.

Referring to FIG. 11, the display device 100 starts channel scanning in the rightward direction in which the channel number increases from the current channel "910". The channel shift speed gets fast in the general channel section before arriving at the first favorite channel group section 1120, gets slow in the favorite channel group section 1120, and gets fast again when the general channel section starts after the favorite channel group section 1120 ends. Accordingly, the channels of the favorite channel group favored by the user may be quickly scanned and shown to the user.

When a user's release of pressing a channel up button is detected on Channel "1135", the display device 100 may tune the current channel to a favorite channel located nearest in the scanning direction, that is, a first favorite channel 1141 of the third favorite channel group 1140, and then terminate the scanning.

If a user's release of pressing a channel up button is detected on Channel "1155", the display device 100 tunes the current channel to a favorite channel located nearest in the scanning direction. However, because no favorite channel exists in the scanning direction with respect to Channel "1155", the display device 100 tunes the current channel to Channel "1156" that is an adjacent general channel, and then ends the scanning.

Figure 12:
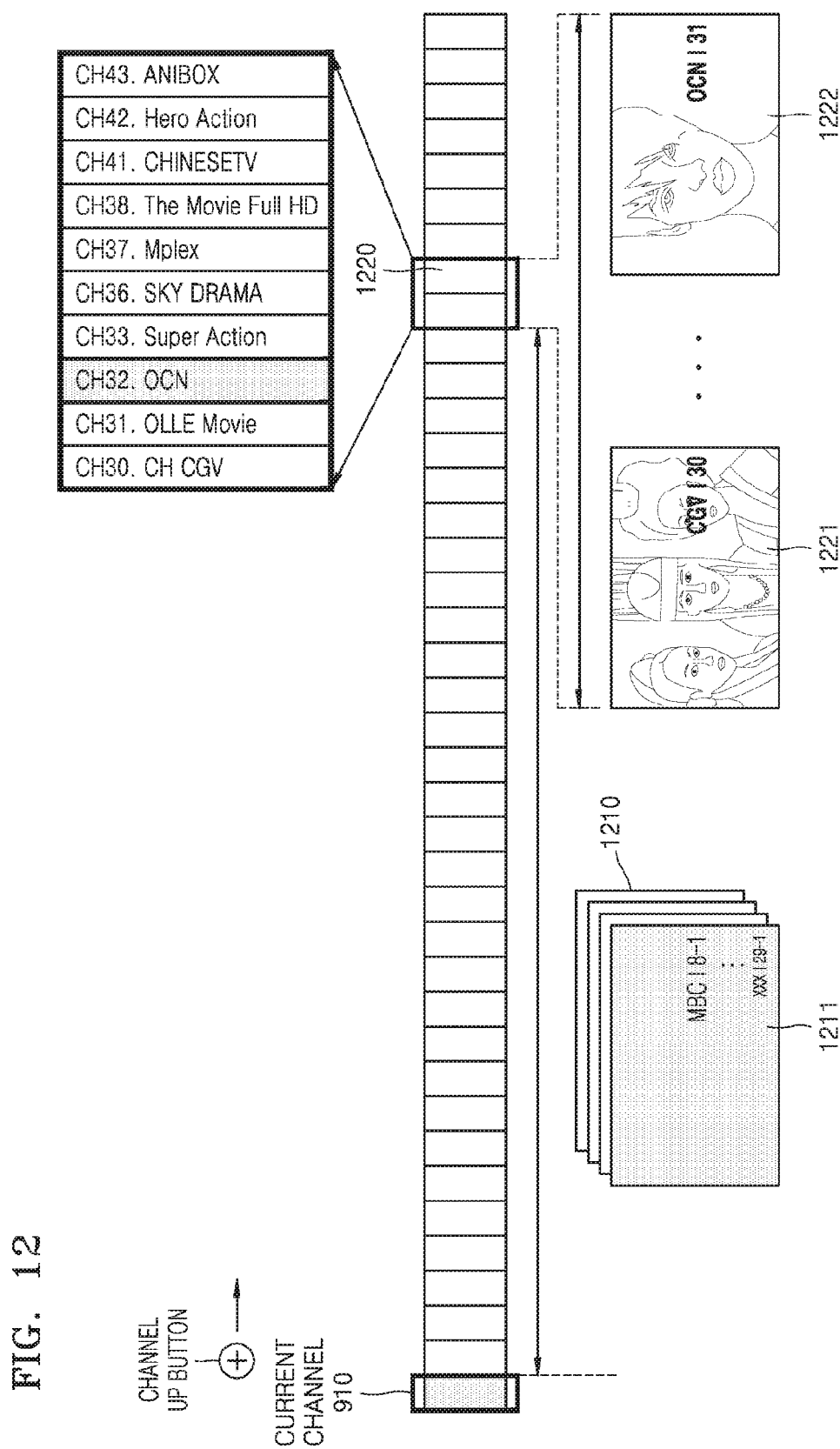
FIG. 12 is a reference view illustrating a method of performing a favorite channel scanning operation according to detection of a channel shift button input, according to an exemplary embodiment.

FIG. 12 is a reference view illustrating a method of performing a favorite channel scanning operation according to detection of a channel shift button input, according to an exemplary embodiment.

Referring to FIG. 12, when the display device 100 detects a long press input of the channel up button 53a of the control device 50 in the state in which the current channel 910 is tuned, the display device 100 starts channel scanning in the rightward direction in which the channel number increases from the current channel 910. The channel shift speed gets fast in the general channel section until the favorite channel group arrives at a movie channel group. Accordingly, the display device 100 may display only a channel number 1211 that is quickly changed, without displaying an image on a screen image 1210, in the general channel section.

The display device 100 decreases the channel shift speed in the favorite channel group section 1220 and displays broadcast signals of the respective channels in screen images 1221 and 1222 so that the user may check content of broadcasting of the channels included in the favorite channel group section.

Figure 13:
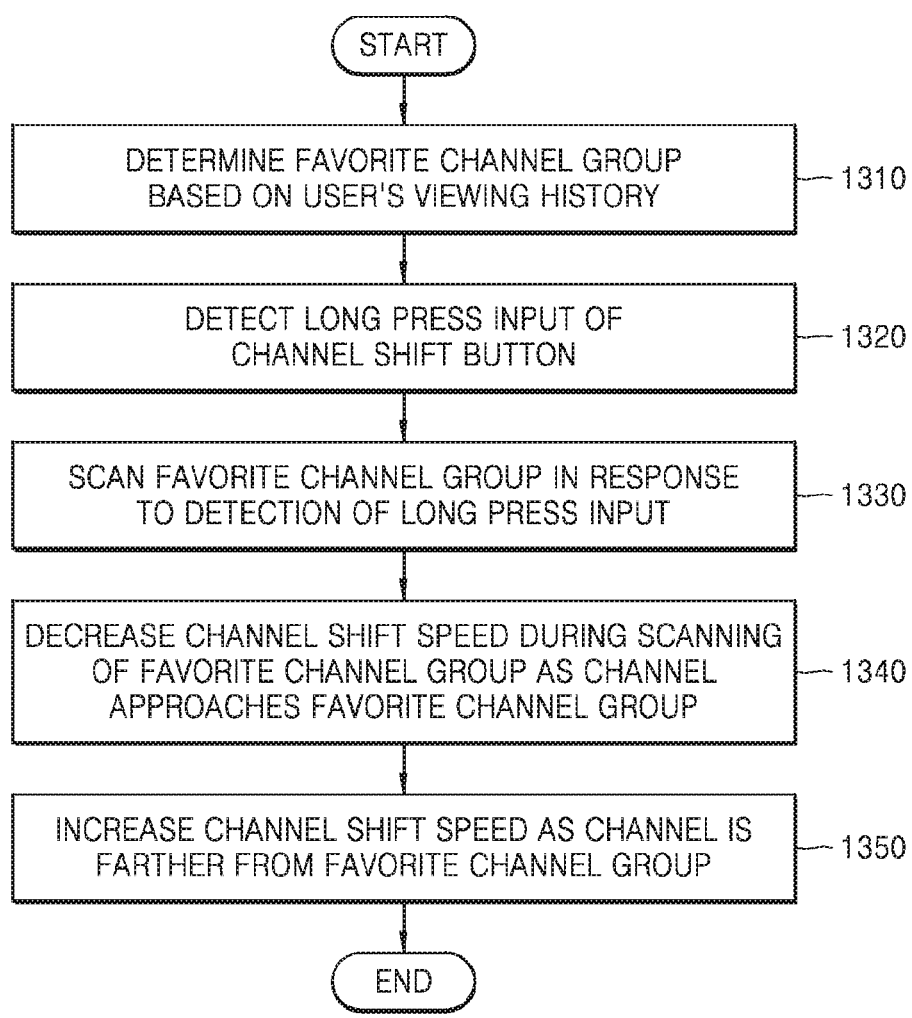
FIG. 13 is a flowchart of a method of scanning a favorite channel group according to a long press input of a channel shift button, according to an exemplary embodiment.

FIG. 13 is a flowchart of a method of scanning a favorite channel group according to a long press input of a channel shift button, according to an exemplary embodiment.

Referring to FIG. 13, in Operation 1310, the display device 100 determines a favorite channel group according to the user's viewing history. A method in which the display device 100 determines a favorite channel group according to the user's viewing history may use the operation described with reference to FIG. 4.

In Operation 1320, the display device 100 detects a long press input of a channel shift button of the control device 50.

In Operation 1330, the display device 100 scans a favorite channel group in response to the detection of a long press input.

In Operation 1340, during the scanning of a favorite channel group, the display device 100 decreases the channel shift speed as the channel approaches the favorite channel group.

In Operation 1350, the display device 100 increases the channel shift speed as the channel is farther from the favorite channel group.

Figure 14:
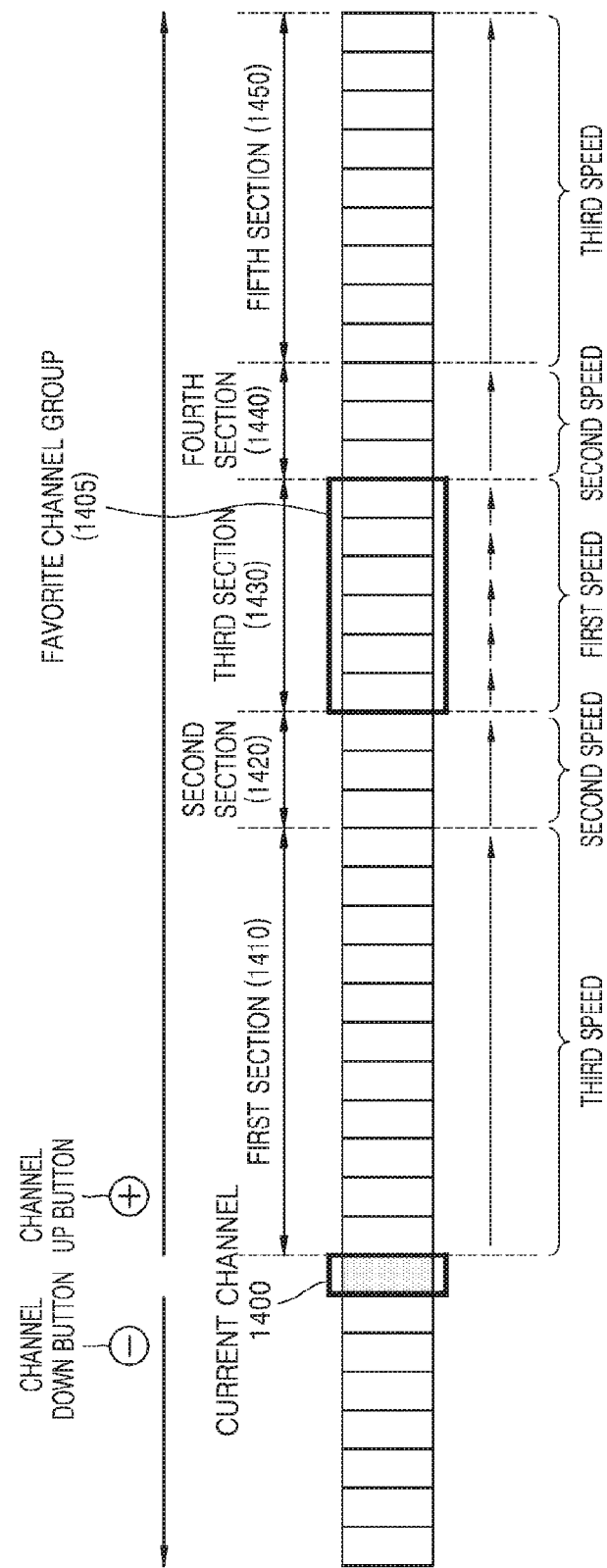
FIG. 14 is a reference view illustrating a method of scanning a favorite channel group according to a long press input of a channel shift button, according to an exemplary embodiment.

FIG. 14 is a reference view illustrating a method of scanning a favorite channel group according to a long press input of a channel shift button, according to an exemplary embodiment.

Referring to FIG. 14, in a state in which a current channel 1400 is tuned, when the display device 100 detects a long press input of the channel up button 53*a* of the control device 50, the display device 100 scans a favorite channel group in a direction in which the channel number increases from the current channel 1400. A favorite channel group 1405 exists in a direction in which the channel number increases from the current channel 1400. The display device 100 may decrease the channel shift speed as the channel approaches the favorite channel group 1405 and increase the channel shift speed as the channel is farther from the favorite channel group 1405.

Referring to FIG. 14, the display device 100 may divide a section of channels existing in a direction in which the channel number increases from the current channel 1400 into a few sections. Sections of channels located farther from the favorite channel group 1405 are set to be a first section 1410 and a fifth section 1450. Sections of channels located close to the favorite channel group 1405 are set to be a second section 1420 and a fourth section 1440. A section of channels corresponding to the favorite channel group 1405 is set to be a third section 1430.

The display device 100 may decrease the channel shift speed as the channel approaches the third section 1430 corresponding to the favorite channel group 1405. For example, the display device 100 may perform channel change by setting the channel shift speed to a third speed in the first section 1410 located far from the third section 1430 corresponding to the favorite channel group 1405 and the channel shift speed to a second speed, which is slower than the third speed, in the second section 1420 located closer to the third section 1430 than the first section 1410. The display device 100 may perform channel change at the first speed, which is slower than the second speed, in the third section 1430 corresponding to the favorite channel group 1405, at the second speed in the fourth section 1440 by increasing the channel shift speed, and at the third speed in the fifth section 1450 located farther from the third section 1430 by increasing the channel shift speed.

According to one or more exemplary embodiments, the first speed to the third speed may be determined in various ways. However, in the third section 1430 corresponding to the favorite channel group 1405, the channel shift speed may be similar to the speed when the user performs a general channel up/down button operation so that the user may check broadcast signals of the favorite channels in the favorite channel section.

Figure 15:
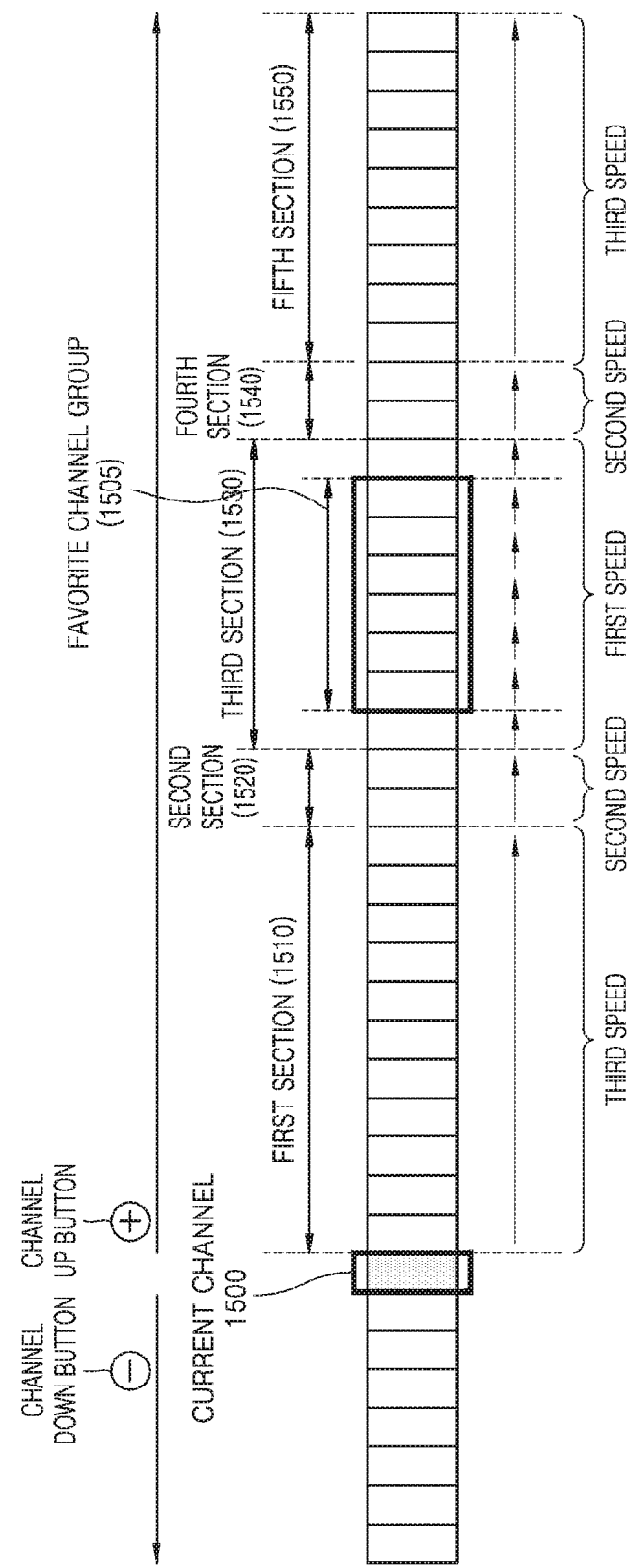
FIG. 15 is a reference view illustrating a method of scanning a favorite channel group according to a long press input of a channel shift button, according to an exemplary embodiment.

FIG. 15 is a reference view illustrating a method of scanning a favorite channel group according to a long press input of a channel shift button, according to an exemplary embodiment.

Referring to FIG. 15, in a state in which a current channel 1500 is tuned, when the display device 100 detects a long press input of the channel up button 53*a* of the control device 50, the display device 100 scans a favorite channel group in a direction in which the channel number increases from the current channel 1500. A favorite channel group 1505 exists in a direction in which the channel number increases from the current channel 1500. The display device 100 may decrease the channel shift speed as the channel approaches the favorite channel group 1505 and increase the channel shift speed as the channel is farther from the favorite channel group 1505.

The speed for each channel in FIG. 15 is different from an exemplary embodiment of FIG. 14 in that the third section corresponding to the favorite channel group is extended to channels adjacent to the favorite channel group.

Referring to FIG. 15, the display device 100 may set the channel shift speed to a third speed in the first section 1510 in which channel scanning starts and the channel shift speed to a second speed, which is slower than a third speed, in the second section 1520 close to the favorite channel group 1505. The display device 100 may set the channel change sped to a first speed, which is slower than the second speed, in the third section 1530 including the favorite channel group 1505 and channels adjacent to the favorite channel group 1505. Unlike FIG. 14, when the channel arrives at adjacent channels before starting the scanning of a favorite channel group, the channel shift speed is set to be a first speed so that the user may be stably check the first channel of the favorite channel group. Next, the display device 100 may increase the channel shift speed to the second speed in the fourth section 1540, thereby performing the channel change at the second speed, and increase the channel shift speed to the third speed, which is faster than the second speed, in the fifth section 1550, thereby perform the channel change at the third speed.

The display device 100 according to an exemplary embodiment may further increase the channel shift speed as a duration time of a channel shift button input increases. For example, when the user presses the channel shift button of the control device 50 for 10 seconds, the display device 100 may further increase the channel shift speed, compared to a case of pressing the channel shift button for 5 seconds. In other words, for example, when the number of channels scanned when the user presses the channel shift button of the control device 50 for 5 seconds is 50, the display device 100 may further increase the channel shift speed so that the number of channels scanned when the user presses the channel shift button of the control device 50 for 10 seconds is 200, not 100 (50×2).

Figure 16B:
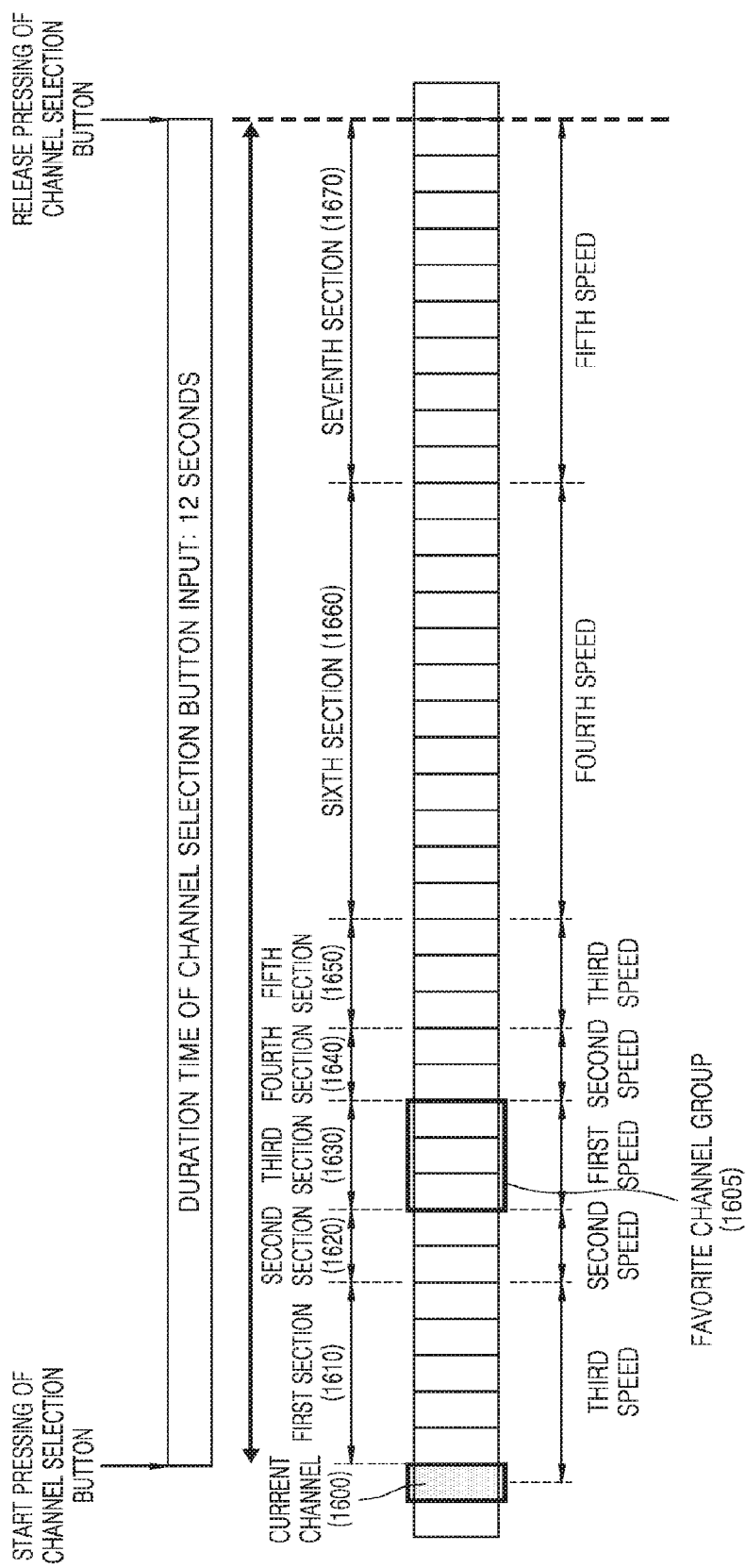

FIGS. 16A and 16B are reference views illustrating an example of further increasing a channel shift speed as a duration time of a channel shift button input increases.

FIG. 16A illustrates scanning of a favorite channel group when a duration time of a channel shift button input is, for example, 5 seconds.

Referring to FIG. 16A, when the duration time from pressing of the channel shift button of the control device 50 until the button pressing is released is 5 seconds, the channel shift speed in a first section 1610 is the third speed, the channel shift speed in a second section 1620 is the second speed, the channel shift speed in a third section 1630 corresponding to a favorite channel group 1605 is the first speed, the channel shift speed in a fourth section 1640 is the second speed, and the channel shift speed in a fifth section 1650 is the third speed. The second speed is faster than the first speed and the third speed is faster than the second speed.

FIG. 16B illustrates scanning of a favorite channel group when a duration time of a channel shift button input is, for example, 12 seconds.

Referring to FIG. 16B, when the duration time from pressing of the channel shift button of the control device 50 until the button pressing is released is 12 seconds, the channel shift speeds in the first to fifth sections 1610 to 1650 are the same as those illustrated in FIG. 16A. However, the display device 100 increases the channel shift speed to a fourth speed, which is faster than the third speed, in a sixth section 1660 following the fifth section 1650. Also, when the channel shift button input continues to a seventh section 1670 following the sixth section 1660, the display device 100 may increase the channel shift speed to a fifth speed, which is faster than the fourth speed.

The term "module" used in one or more exemplary embodiments may denote a unit including one or two or more combinations of, for example, hardware, software, or firmware. The module may be interchangeably used with terms for example, units, logics, logical blocks, components, or circuits. The module may be a minimum unit of a part that is integrally formed or a part thereof. The module may be a minimum unit performing one or more functions or a part thereof. The module may be embodied mechanically or electronically. For example, the modules according to one or more exemplary embodiments may include at least one of an application-specific integrated circuit (ASIC) chip, field-programmable gate arrays (FPGAs), or a programmable-logic device, which performs a certain operation that is already known or will be developed in the future.

According to one or more exemplary embodiments, at least part of an apparatus, for example, modules or functions thereof, or a method, for example, operations, according to one or more exemplary embodiments may be embodied by commands stored in a computer-readable storage media in form of, for example, a programming module. When the command is executed by one or more processors, the one or more processors may perform a function corresponding to the command. The computer-readable medium may be, for example, a memory. At least part of the programming module may be implemented by, for example, a processor. At least part of the programming module may include, for example, modules, programs, routines, sets of instructions, or processes, to perform one or more functions.

Examples of the computer-readable recording medium include magnetic media, e.g., hard disks, floppy disks, and magnetic tapes, optical media, e.g., compact disc read only memories (CD-ROMs) and digital versatile disks (DVDs), magneto-optical media, e.g., floptical disks, and hardware device configured to store and execute program commands, for example, programming modules, e.g., read only memories (ROMs), random access memories (RAMs), flash memories. Also, the program command may include not only machine codes created by a compiler but also high-level language codes executable by a computer using an interpreter. The above-described hardware apparatuses may be configured to operate as one or more software modules to perform operations according to one or more exemplary embodiments, or vise versa.

A module or programming module according to one or more exemplary embodiments may include at least one of the above-described elements or the at least one of the above-described elements may be omitted or additional other elements may be further included. According to one or more exemplary embodiments, operations may be performed by modules, programming modules, or other elements in a sequential, parallel, iterative, or heuristic method. Also, some operations may be performed in a different order, omitted, or other operations may be added thereto.

Exemplary embodiments are described for clear understanding by referring to different functional units and processes. However, functions may be appropriately distributed among different functional units or processors. For example, the functions described to be performed by independent processors or controllers may be performed by the same processor or controller and, in some cases, these functions may be interchangeable. As a result, references to particular functional units may be interpreted to refer to an appropriate means performing a function, not indicating strictly logical or physical structures or organizations.

Although the inventive concept is described through one or more exemplary embodiments, the inventive concept is not limited to the particular format described herein. Also, the above-described exemplary embodiments may be combined. In the accompanying claims, the term "comprise" does not exclude that other elements or operations may further exist.

Furthermore, although many devices, elements, or operations are listed, they may be implemented by a single unit or processor. Also, even when individual characteristics are included in different claims, they may be combined to one another and, even when the characteristics are included in different claims, it does not mean that they are not combinable or that a combination thereof is disadvantageous. Also, the characteristics included in one category of the claims are not limited to the category only and may be identically applied to the claims of other categories in an appropriate method.

As described above, according to one or more exemplary embodiments, fast movement to a channel number of a user favorite group is possible by using only a channel up/down button, which is a basic function, without inputting through numerical buttons of a remote controller or entering an EPG.

Also, according to one or more exemplary embodiments, inconvenience in manipulation and inputting during channel change may be reduced and a time to determine a channel may be reduced by using program information.

It should be understood that exemplary embodiments described herein should be considered in a descriptive sense only and not for purposes of limitation. Descriptions of features or aspects within each exemplary embodiment should be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An electronic device comprising:
a detector configured to detect a user input; and
a controller configured to:
  determine a favorite channel group according to a user's viewing history;
  in response to detecting the user input of a control signal corresponding to a channel shift button for a predetermined time, scan channels at a channel shift speed; and
  decrease the channel shift speed in a favorite channel group section corresponding to the determined favorite channel group and increase the channel shift speed in a section other than the favorite channel group section,
wherein the channel shift speed comprises a first speed, a second speed that is faster than the first speed, and a third speed that is faster than the second speed, and
wherein the controller is further configured to:
  in response to a current channel being in a first section that contains channel numbers that are located a first distance from the favorite channel group, scan the channels at the third speed,
  in response to a current channel being in a second section that contains channel numbers that are located a second distance from the favorite channel group, scan the channels at the second speed, the second distance being shorter than the first distance, and
  in response to a current channel being in a third section that contains channel numbers within the favorite channel group, scan the channels at the first speed.

2. The electronic device of claim 1, wherein the controller is further configured to, during the determining of the favorite channel group:
  determine a favorite channel based on the user's viewing history;
  determine at least one other channel besides the determined favorite channel having properties related to the determined favorite channel by using metadata of the determined favorite channel; and
  determine the favorite channel group comprising the determined favorite channel and the at least one other channel.

3. The electronic device of claim 1, further comprising a communicator configured to receive information about another user's viewing history from a server,
wherein the controller is further configured to determine the favorite channel group based on the information received about the other user's viewing history.

4. The electronic device of claim 1, wherein, the controller is configured to decrease the channel shift speed as a channel approaches the favorite channel group section and increase the channel shift speed as the channel moves away from the favorite channel group section.

5. The electronic device of claim 1, wherein the favorite channel group section comprises the favorite channel group and at least one adjacent channel that is adjacent to the favorite channel group.

6. The electronic device of claim 1, wherein the controller is configured to increase the channel shift speed as a continuous input time of the control signal according to the channel shift button increases.

7. The electronic device of claim 1, wherein the controller is configured to select a favorite channel that is located nearest to a current channel, in a scanning direction, when the input of the control signal according to the channel shift button ends.

8. The electronic device of claim 1, wherein the detector is configured to receive, from a control device, a control signal corresponding to the channel shift button.

9. The electronic device of claim 1, wherein the detector is configured to detect the control signal corresponding to the channel shift button on a touch sensitive screen.

10. The electronic device of claim 1, wherein the detector is further configured to recognize a user and the controller is configured to manage the favorite channel group for each user recognized by the detector.

11. A method of scanning a channel in an electronic device, the method comprising:
  in response to detecting an input of a control signal corresponding to a channel shift button for a predetermined time, scanning channels at a channel shift speed,
  wherein the channel shift speed is decreased in a favorite channel group section corresponding to a favorite channel group determined based on a user's viewing history, and the channel shift speed is increased in a section other than the favorite channel group section, and
  wherein the channel shift speed comprises a first speed, a second speed that is faster than the first speed, and a third speed that is faster than the second speed, and
  in response to a current channel being in a first section that contains channel numbers that are located a first distance from the favorite channel group, scanning the channels at the third speed,
  in response to a current channel being in a second section that contains channel numbers that are located a second distance from the favorite channel group, scanning the channels at the second speed, the second distance being shorter than the first distance, and
  in response to a current channel being in a third section that contains channel numbers within the favorite channel group, scanning the channels at the first speed.

12. The method of claim 11, wherein the favorite channel group is generated by determining a favorite channel based on the user's viewing history, determining at least one other channel besides the determined favorite channel having properties related to the determined favorite channel by using metadata of the determined favorite channel, and determining the favorite channel group comprising the determined favorite channel and the at least one other channel.

13. The method of claim 11, further comprising:
  receiving from a server information about another user's viewing history; and
  determining the favorite channel group based on the information received about the other user's viewing history.

14. The method of claim 11, wherein the scanning of the channels comprises:
  decreasing the channel shift speed as a channel approaches the favorite channel group section; and
  increasing the channel shift speed as the channel moves away from the favorite channel group section.

15. The method of claim 11, wherein the favorite channel group section comprises the favorite channel group and at least one adjacent channel that is adjacent to the favorite channel group.

16. The method of claim 11, wherein the scanning of the channels comprises increasing the channel shift speed as a continuous input time of the control signal according to the channel shift button increases.

17. The method of claim 11, further comprising selecting a favorite channel that is located nearest to a current channel, in a scanning direction, when the input of the control signal according to the channel shift button ends.

18. The method of claim 11, the method further comprising:
   determining the user's viewing history according to a viewing frequency of at least one channel; and
   determining the favorite channel group according to the user's determined viewing history.

19. A non-transitory computer readable storage medium having stored thereon a program, which when executed by a computer, performs a method comprising:
   in response to detecting an input of a control signal corresponding to a channel shift button for a predetermined time, scanning channels at a channel shift speed,
   wherein the channel shift speed is decreased in a favorite channel group section corresponding to a favorite channel group determined based on a user's viewing history, and the channel shift speed is increased in a section other than the favorite channel group section, and
   wherein the channel shift speed comprises a first speed, a second speed that is faster than the first speed, and a third speed that is faster than the second speed, and
   in response to a current channel being in a first section that contains channel numbers that are located a first distance from the favorite channel group, scanning the channels at the third speed,
   in response to a current channel being in a second section that contains channel numbers that are located a second distance from the favorite channel group, scanning the channels at the second speed, the second distance being shorter than the first distance, and
   in response to a current channel being in a third section that contains channel numbers within the favorite channel group, scanning the channels at the first speed.

* * * * *